US010888052B2

(12) United States Patent
Atteberry

(10) Patent No.: US 10,888,052 B2
(45) Date of Patent: Jan. 12, 2021

(54) DEVICE AND METHOD FOR STRIPPING FLOWERS, BUDS, OR LEAVES FROM HERBS OR PLANTS

(71) Applicant: G4 Products, LLC, Las Vegas, NV (US)

(72) Inventor: Wade Eugene Atteberry, San Jose, CA (US)

(73) Assignee: G4 Products, LLC, Las Vegas, NV (US)

( * ) Notice: Subject to any disclaimer, the term of this patent is extended or adjusted under 35 U.S.C. 154(b) by 124 days.

(21) Appl. No.: 15/971,959

(22) Filed: May 4, 2018

(65) Prior Publication Data

US 2018/0317404 A1    Nov. 8, 2018

Related U.S. Application Data

(63) Continuation of application No. 29/644,120, filed on Apr. 14, 2018, now Pat. No. Des. 862,180, and a
(Continued)

(51) Int. Cl.
*A01G 3/00* (2006.01)
*A01G 22/60* (2018.01)
(Continued)

(52) U.S. Cl.
CPC .............. *A01G 22/60* (2018.02); *A01D 46/22* (2013.01); *B65D 85/505* (2013.01); *A01G 2003/005* (2013.01)

(58) Field of Classification Search
CPC .... A01G 3/00; A01G 3/002; A01G 2003/005; A01G 2003/023; A01G 3/08;
(Continued)

(56) References Cited

U.S. PATENT DOCUMENTS 48,136 A       6/1865  Thacher
1,265,410 A *  5/1918  Wolken ................ A01D 46/247
                                                      56/339
(Continued)

FOREIGN PATENT DOCUMENTS

CA       2694807 A1    8/2011
CN    103098657 A      5/2013
(Continued)

OTHER PUBLICATIONS

Laegerbuilt, The Stripper Machine, Apr. 11, 2012, YouTube.com, https://youtube.com/watch?v=V3SS-2Ygc8E.
(Continued)

*Primary Examiner* — Kristen C Hayes
(74) *Attorney, Agent, or Firm* — Lapple Ubell IP Law, LLP; Matthew C. Lapple

(57) ABSTRACT

The invention provides a device and method for quickly, easily and accurately removing flowers or buds from a plant stem in a single step by using a device that is a cover or partial cover for a bucket or container that can be attached and removed from the bucket or container, and the device further providing one or more substantially rigid grooves or shaped edges and pressing an herb or stem of herbs or plants firmly into and against the one or more grooves or shaped edges utilizing a method according to the invention to permit stripping or removing the flower(s) or bud(s) that are attached to the plant or herb stem in a single step. In a preferred aspect, the invention provides such devices and methods that include a device having a plurality of grooves or shaped edges that can efficiently catch and strip buds or flowers from herbs or plants.

48 Claims, 18 Drawing Sheets

Related U.S. Application Data continuation of application No. 29/644,119, filed on Apr. 13, 2018, now Pat. No. Des. 862,281.

(60) Provisional application No. 62/502,422, filed on May 5, 2017.

(51) Int. Cl.
  *B65D 85/50* (2006.01)
  *A01D 46/22* (2006.01)

(58) Field of Classification Search
  CPC .. A01G 3/081; A01G 2005/005; A01D 46/12; A01D 33/02; A01D 46/247; A01D 1/06; A01D 1/00; A01D 1/08; A01D 1/14; A01D 46/00; A01D 46/082; A47G 7/00; A47G 7/02; A47G 7/07; B26B 11/00; A24B 5/06; B65D 85/505; A47J 21/00; A47J 43/18; A23N 15/01; A23N 15/02
  See application file for complete search history.

(56) References Cited

U.S. PATENT DOCUMENTS

| | | | | |
|---|---|---|---|---|
| 1,539,153 | A * | 5/1925 | Bennett | A47G 7/07 47/41.11 |
| 1,729,762 | A * | 10/1929 | Melville | A01D 46/247 56/339 |
| 3,854,273 | A * | 12/1974 | Rosenberg | A01D 46/247 56/334 |
| 4,928,424 | A * | 5/1990 | Campanelli | A01G 3/00 47/58.1 R |
| 5,044,115 | A * | 9/1991 | Richardson | A01G 5/00 144/24.13 |
| 5,062,238 | A * | 11/1991 | Smith | A01G 5/00 30/279.2 |
| 5,724,799 | A * | 3/1998 | Hsia | A01D 46/247 56/339 |
| 5,899,019 | A * | 5/1999 | Groves | A01G 5/00 47/1.01 R |
| 7,028,844 | B2 | 4/2006 | Nelson | |
| 7,310,909 | B2 * | 12/2007 | Broel | A47G 7/02 248/27.8 |
| 7,909,687 | B2 * | 3/2011 | Al-Harbi | A47J 43/18 460/134 |
| 8,267,256 | B2 | 9/2012 | Berthet et al. | |
| 9,044,109 | B2 * | 6/2015 | De Pagter | A47G 7/06 |
| 9,532,509 | B2 | 1/2017 | Mayer | |
| 9,832,937 | B2 * | 12/2017 | Schroeder | A23N 15/06 |
| 10,301,071 | B2 * | 5/2019 | Mockler | B65D 25/02 |
| 2002/0144457 | A1 | 10/2002 | Harrison, Jr. | A01G 5/00 47/1.01 R |
| 2009/0264170 | A1 * | 10/2009 | Al-Harbi | A23N 15/02 460/137 |
| 2013/0205602 | A1 | 8/2013 | Mayer | |
| 2015/0040734 | A1 | 2/2015 | Harris | |
| 2015/0047485 | A1 | 2/2015 | Schroeder | |
| 2018/0263273 | A1 * | 9/2018 | Dickie | A47J 17/00 |

FOREIGN PATENT DOCUMENTS

| | | |
|---|---|---|
| CN | 104396589 A | 3/2015 |
| CN | 106386198 A | 2/2017 |
| KR | 10-2002-0078121 A | 10/2002 |
| KR | 10-2012-0025835 A | 3/2012 |

OTHER PUBLICATIONS

Thundervak Machine, Best Bud Trimmer, Oct. 18, 2013, YouTube. com, https://youtube.com/watch?v=hNCQuWC9YZY.
Williams-Sonoma, Williams Sonoma Herb & Kale Stripper, Sep. 6, 2017, www.williams-sonoma.com, https://www.williams-sonoma.com/products/williams-sonoma-herb-kale-stripper/?catalogId . . . .
International Search Report and Written Opinion mailed by International Application Division Korean Intellectual Property Office dated Sep. 4, 2018 in the corresponding International Patent Application No. PCT/US2018/031238.

\* cited by examiner

DEVICE AND METHOD FOR STRIPPING FLOWERS, BUDS, OR LEAVES FROM HERBS OR PLANTS

CROSS-REFERENCE TO RELATED APPLICATIONS

This application claims the benefit of, and priority to, U.S. Provisional Patent Application Ser. No. 62/502,422, filed May 5, 2017; U.S. Design patent application Ser. No. 29/644,120, filed Apr. 13, 2018; and U.S. Design patent application Ser. No. 29/644,119, filed Apr. 13, 2018. The entire contents of these priority applications are hereby incorporated by reference in their entirety as if fully set forth herein.

FIELD OF THE DISCLOSURE

This invention is in the field of plant or herb component harvesting, and the field further relates to one or more novel devices and methods for using one or more such devices to strip buds or flowers, or both from a useful plant that forms flowers or buds.

DESCRIPTION OF RELATED ART

Many flowers and buds are edible or otherwise useful in nutrient preparations. In particular, rose flowers, especially their buds (not yet fully blossomed flowers), are very high in Vitamin C and other trace nutrients. In fact, the amount of Vitamin C in rose buds far surpasses amounts in many fruits and vegetables. Isolated flower buds are edible or otherwise consumable, for example, they may be steeped to provide a tea high in the desired nutrients.

Other examples of nutrient flowers are orchids, cactus flowers, lotus and the like. The use of green leaves, flowers or buds in cooking or other consumables is essential for the preparation of numerous side dishes for various styles of cooking. Example leaves are herbs and plants such as parsley, basil, coriander, mint, and many others that can be incorporated into recipes both for health benefits and for the creation of different tastes to bring out the natural flavors of the foods.

A still further example of nutrient flowers are *cannabis* and hops. Each produces flower bracts, often called either flowers or buds, which are used for nutrition, medicine, recreational consumption and/or culinary purposes.

The flowers, buds and leaves are conventionally picked from the stems of the plants by hand which requires a great deal of time and effort. In the *cannabis* industry this process is referred to as "bucking" or "debudding." It can performed by hand with scissors or clippers. The hand picking procedure demands continuous concentration and often requires more than one person to yield the amount of leaves, flowers or buds required for certain recipes. There are known devices for cutting and chopping plants for cooking, and a device is described in U.S. Pat. No. 7,907,687 to Al-Harbi that was adapted to remove leaves from stems of herbs and plants. The Al-Harbi devices have flexible comb-like tines that catch leaves on the distal ends of plants as they are drawn through the flexible comb teeth in a first step by pulling on the proximal ends of the stems, and a blade to then lifted to dislodge the leaves caught in the flexible comb tines. However, rose buds stems are stronger and would not be efficiently stripped from the stems without losing the flexible nature of the tines. Further, the need to use a rotating arm in a second step to remove the buds or flowers from the stems is inefficient or could damage the buds.

There are also known machines for removing flowers or buds, referred to in the *cannabis* industry as "bucking machines." Such machines are typically electric or gasoline driven, and use belts, combs or other grabbing devices to grab and pull the cut end of a flower stem through a small hole in a metal plate, thereby stripping off the buds as they contact the front of the plate. This presents a disadvantage, in that the size of the hole must fit the widest part of the stem being bucked. For long stems, which narrow significantly over their length, the hole may be able to buck buds on the lower and thicker part of the stem, but may be too wide, and therefore miss, buds on the higher and thinner end of the stem. This also frequently results in the bucking machine drawing a number of small, unbucked buds into the belts, combs or grabbing devices. Because *cannabis* buds are normally sticky or tacky with resin, these unbucked buds can eventually "gum-up" the mechanisms of known mechanical bucking machines. Further, currently known bucking machines are expensive, costing hundreds or thousands of dollars. Moreover, they are prone to breakdowns and heavy maintenance requirements, due to the number of moving parts and the need to adjust or replace belts, combs or grabbing devices. Still further, they are require access to an electrical power source or fuel. Additionally, each bucking machine can typically only be used by a single operator at a time. Further, unless the operator is skilled at setting up and adjusting the machine for the particular size and type of buds being bucked, bucking machines can damage buds, if they are removed too forcefully, can fail to remove smaller buds, or can break off stems and leaves prematurely, resulting in the need to further hand-sort the output of the bucking machine.

Finally, if a bucking machine breaks down, it can jeopardize the quality of the finished *cannabis* product. Typically, *cannabis* buds are bucked after a limited drying period, to ensure that they are not green, but before they have fully dried. Then, bucked buds are placed in airtight packaging to reduce further loss of moisture and/or further evaporation of cannabinoids. For many growers, the timing of the bucking operation is critical, to ensure that their *cannabis* buds are dry enough to process, but no drier. Overly dried *cannabis* buds become crumbly and can break into small pieces, which are normally seen as undesirable by consumers. Further, longer drying times can result in the evaporation and loss of desirable cannabinoids, such as THC, CBD and the aromatic terpenes that give *cannabis* its unique flavor and smell. Thus, any failure of a mechanical bucking machine during the critical moisture window that delays the bucking operation can result in reduced quality, and therefore less valuable, *cannabis* buds.

Accordingly, there is a need for an improved, efficient, cost-effective, reliable, low maintenance, labor saving device and method for removing flowers or buds from a plant stem in a single step. Optionally, there is a need for an improved device or method for removing leaves from the stems of herbs or plants, especially woody plant herbs, such as rosemary, thyme, *cannabis*, hops, and the like.

SUMMARY

The various embodiments of the present devices and method for stripping flowers, buds, or leaves from herbs or plants have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that there is a need for an improved, efficient, cost-effective, reliable, low maintenance, labor saving device and method for removing flowers or buds from a plant stem in a single step. The present embodiments solve this problem by providing a flower stripping device that can be affixed to a bucket or a flat surface, and method of use that may be used by a worker to strip an entire flower stem by drawing the stem through a pair of opposed blades, or through a cutting notch, that is appropriately sized for removal of the flowers from that particular stem.

In a first aspect, a flower stripping device is provided, the flower stripping device comprising a rim, wherein the rim is configured as an arc or circle and further configured to be affixable to an edge of a bucket with an open top, a pair of opposed cutting blades extending radially inward from the rim, wherein the pair of opposed cutting blades are configured such that, when the rim is affixed to the edge of the bucket, the pair of opposed cutting blades extends over the open top of the bucket.

In an embodiment of the first aspect, the pair of opposed cutting blades comprise a cutting notch formed in a deck affixed to and substantially perpendicular to the rim.

In another embodiment of the first aspect, the pair of opposed cutting blades are configured to form an opening, with an opening distance measured between a respective edge of each of the pair of opposed cutting blades at the opening, and a terminus, with a terminus distance, measured between a respective edge of each of the pair of opposed cutting blades at the terminus, where the opening distance is greater than the terminus distance.

In another embodiment of the first aspect, the opening distance is at least one inch.

In another embodiment of the first aspect, the opening distance is at least three-quarters of an inch.

In another embodiment of the first aspect, the opening distance is less than or equal to half an inch.

In another embodiment of the first aspect, the opening distance is between half an inch and a quarter of an inch.

In another embodiment of the first aspect, the terminus is a pointed bottom V-shape and the terminus distance is zero.

In another embodiment of the first aspect, the terminus is a round bottom U-shape and the terminus distance is at least one-sixteenth of an inch.

In another embodiment of the first aspect, the terminus is a round bottom U-shape and the terminus distance is between one-sixteenth of an inch and an eighth of an inch.

In another embodiment of the first aspect, the pair of opposed cutting blades are configured to form an opening, with an opening distance measured between a respective edge of each of the pair of opposed cutting blades at the opening, and a terminus, with a terminus distance, measured between a respective edge of each of the pair of opposed cutting blades at the terminus, where the opening distance is less than the terminus distance.

In another embodiment of the first aspect, the terminus is serrated.

In another embodiment of the first aspect, the device comprises plastic, metal, rigid or semi-rigid polymer, or a combination thereof.

In another embodiment of the first aspect, the rigid or semi-rigid polymer is an ABS or PVC polymer.

In another embodiment of the first aspect, the rim further comprises a snap configured to attach the rim to the bucket.

In a second aspect, a flower stripping device is provided, the device comprising a rim, where the rim is configured as an arc or circle having a first radius, where the rim is configured to be affixable to an edge of a bucket having a second radius, where the first radius and the second radius are substantially the same, a cutting deck extending radially inward from the rim, where the cutting deck comprises an interior edge, where the cutting deck is configured such that, when the rim is affixed to the edge of the bucket, the interior edge of the cutting deck forms an opening to an interior of the bucket and where the interior edge of the cutting deck is further configured to form at least one cutting notch extending from the opening and toward the rim.

In an embodiment of the second aspect, the interior edge of the cutting deck is configured to form a plurality of cutting notches.

In another embodiment of the second aspect, the at least one cutting notch comprises a pointed bottom V-shaped notch.

In another embodiment of the second aspect, the at least one cutting notch comprises a round bottom V-shaped notch.

In another embodiment of the second aspect, the at least one cutting notch comprises a U-shaped notch.

In another embodiment of the second aspect, the at least one cutting notch comprises an L-shaped notch.

In another embodiment of the second aspect, the interior edge configured to form the least one cutting notch is serrated.

In another embodiment of the second aspect, the at least one cutting notch comprises an opening and a terminus and wherein the width of the at least one cutting notch tapers from the opening to the terminus.

In another embodiment of the second aspect, the width of the at least one cutting notch, measured at the opening, is at least one inch.

In another embodiment of the second aspect, the width of the at least one cutting notch, measured at the opening, is at least at least three-quarters of an inch.

In another embodiment of the second aspect, the width of the at least one cutting notch, measured at the opening, is less than or equal to half an inch.

In another embodiment of the second aspect, the width of the at least one cutting notch, measured at the opening, is between half an inch and a quarter of an inch.

In another embodiment of the second aspect, the terminus is a pointed bottom V-shape and the terminus distance is zero.

In another embodiment of the second aspect, the terminus is a round bottom V-shape and the terminus distance is at least one-sixteenth of an inch.

In another embodiment of the second aspect, the terminus is a round bottom V-shape and the terminus distance is between one-sixteenth of an inch and an eighth of an inch.

In another embodiment of the second aspect, the at least one cutting notch further comprises a sidewall extending outwardly from the interior edge wherein the sidewall is configured to form a bevel.

In another embodiment of the second aspect, the bevel is angled at forty-five degrees with respect to the cutting deck.

In another embodiment of the second aspect, the device comprises plastic, metal, rigid or semi-rigid polymer, or a combination thereof.

In another embodiment of the second aspect, the rigid or semi-rigid polymer is an ABS or PVC polymer.

In another embodiment of the second aspect, the rim further comprises a snap configured to attach the rim to the bucket.

In a third aspect, a flower stripping device for mounting on a fixed surface is provided, the flower stripping device comprising a cutting plate, a support plate, where the support plate extends outwardly from the cutting plate, where the cutting plate has a top edge, and where the top edge is configured to form at least one cutting notch.

In an embodiment of the third aspect, the top edge is configured to form a plurality of cutting notches.

In another embodiment of the third aspect, the support plate is substantially perpendicular to the back side of the cutting plate.

In another embodiment of the third aspect, the cutting plate has a means for affixing the flower stripping device to a flat surface.

In another embodiment of the third aspect, the means for affixing the flower stripping device comprises a plurality of attachment holes.

In another embodiment of the third aspect, the support plate has a means for affixing the flower stripping device to a flat surface.

In another embodiment of the third aspect, the means for affixing the flower stripping device comprises a plurality of attachment holes.

In another embodiment of the third aspect, the at least one cutting notch comprises a pointed bottom V-shape notch.

In another embodiment of the third aspect, the at least one cutting notch comprises a round bottom V-shape notch.

In another embodiment of the third aspect, the at least one cutting notch comprises a U-shaped notch.

In another embodiment of the third aspect, the at least one cutting notch comprises an L-shaped notch.

In another embodiment of the third aspect, the interior edge configured to form the least one cutting notch is serrated.

In another embodiment of the third aspect, the at least one cutting notch comprises an opening and a terminus and wherein the width of the at least one cutting notch tapers from the opening to the terminus.

In another embodiment of the third aspect, the width of the at least one cutting notch, measured at the opening, is at least one inch.

In another embodiment of the third aspect, the width of the at least one cutting notch, measured at the opening, is at least at least three-quarters of an inch.

In another embodiment of the third aspect, the width of the at least one cutting notch, measured at the opening, is less than or equal to half an inch.

In another embodiment of the third aspect, the width of the at least one cutting notch, measured at the opening, is between half an inch and a quarter of an inch.

In another embodiment of the third aspect, the at least one cutting notch further comprises a sidewall extending outwardly from the interior edge, where the sidewall is configured to form a bevel.

In another embodiment of the third aspect, the bevel is angled at forty-five degrees.

In another embodiment of the third aspect, the device comprises plastic, metal, rigid or semi-rigid polymer, or a combination thereof.

In another embodiment of the third aspect, the rigid or semi-rigid polymer is an ABS or PVC polymer.

In a fourth aspect, a method for removing a flower from a flower stem is provided, using a flower stripping device comprising a rim, where the rim is configured as an arc or circle and further configured to be affixable to an edge of a bucket with an open top, a pair of opposed cutting blades extending radially inward from the rim, where the pair of opposed cutting blades is configured such that, when the rim is affixed to the edge of the bucket, the pair of opposed cutting blades extends over the open top of the bucket, the method comprising affixing the rim to the edge of the bucket, selecting the flower stem, wherein the stem comprises a stem portion, a cut end, a flower, and a flower end, positioning the flower stem such that the stem portion is between the pair of opposed cutting blades and the cut end of the flower stem is proximal to the upper side of the pair of opposed cutting blades and the flower end is inside the bucket, drawing the flower stem through the pair of opposed cutting blades to detach and remove the flower from the flower stem.

In an embodiment of the fourth aspect, the rim further comprises a plurality of pairs of opposed cutting blades, where each of the plurality of pairs of opposed cutting blades has a different width or configuration, the method further comprising selecting a pair of opposed cutting blades that is appropriately sized and configured to remove the flower.

An object of the invention is to provide a device and method for quickly, easily and accurately removing flowers or buds from a plant stem in a single step by using a device that is a cover or partial cover for a bucket or container that can be attached and removed from the bucket or container, and the device further providing one or more substantially rigid grooves or shaped edges and optionally having a separate or connected device for pressing an herb or stem of herbs or plants firmly into and against the one or more grooves or shaped edges utilizing a method according to the invention to permit stripping or removing the flower(s) or bud(s) that are attached to the plant or herb stem in a single step.

Another object of the invention is to provide a method for stripping buds and/or flowers from the stems of herbs and plants in a single step using the device according to the invention. Preferably, the method of stripping buds and or flowers from the stems of plants is practiced with the device by affixing or holding a plant or herb stem that includes buds and or flowers within the grooves or shaped edges of the device and drawing the stems past the one or more grooves or shaped edges to detach and remove the buds or flowers from their stem.

Other aspects and advantages of the present invention will become apparent from the following detailed description, taken in conjunction with the accompanying drawings, illustrated by way of example of the principles of the invention.

The device may be constructed from rigid or semi-rigid plastic, metal, or a variety of plastics, composites, metals, or alloys employed into products like this by those skilled in the art. The device may detachably affixed to the bucket or container by means of Velcro, magnets, glue, tape, buttons, screws, clips, snaps, snap fittings, or other attachment means known to those skilled in the art.

DETAILED DESCRIPTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
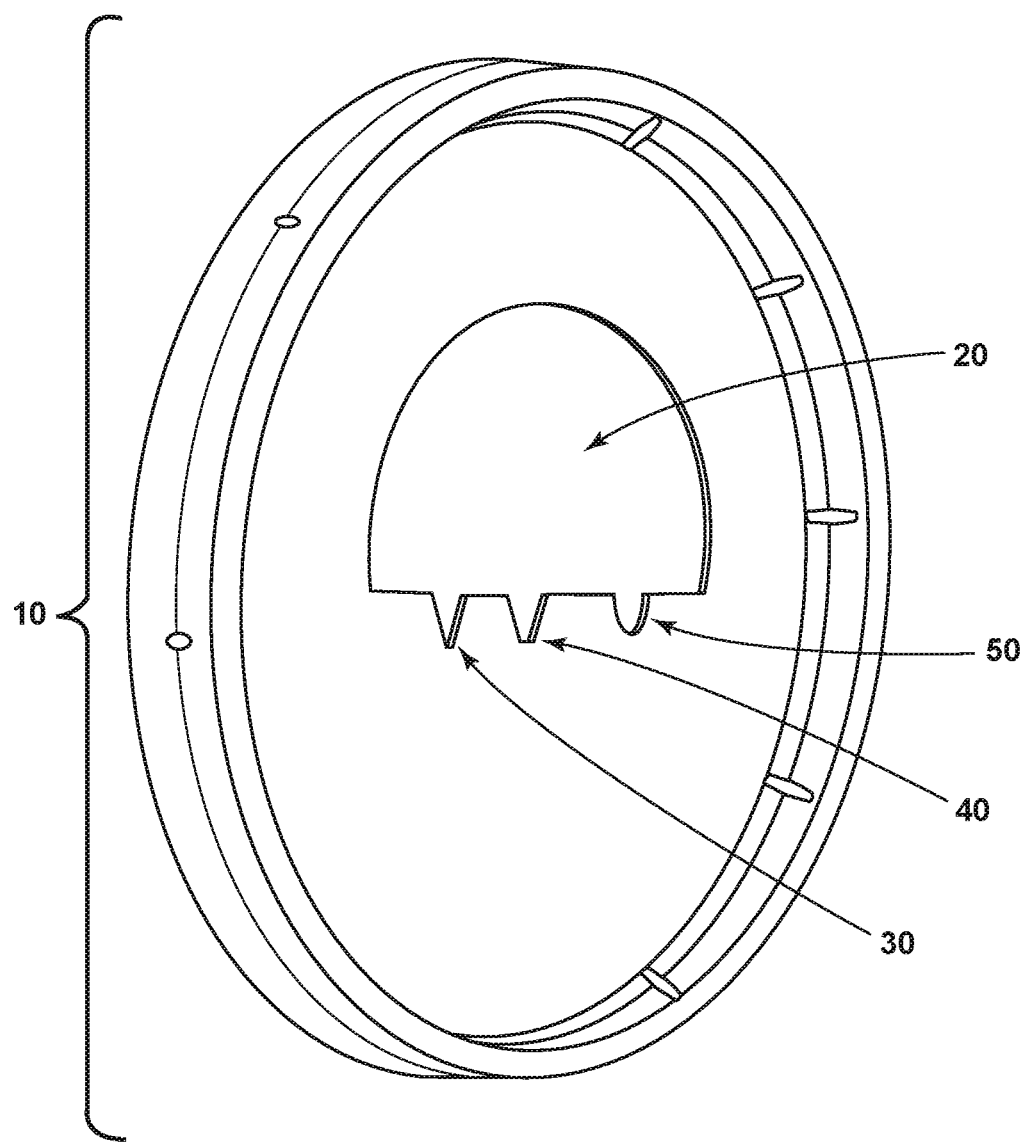
FIG. 1 is an angular side view of a bucket or container cover device embodiment having a hole in the middle of the bucket or container cover large enough to retrieve objects from within the bucket or container without needing to remove the cover and the cover device having on one side of the hole a plurality of grooves or notches for stripping buds or flowers from a plant stem in a single step and leaving the buds or flowers deposited within the bucket or container.

With reference to FIG. 1, this embodiment illustrates an angular side view of one modified bucket top apparatus 10 embodiment of the invention that can be removably attached to a bucket container (not shown) for receiving and holding buds or flowers (not shown) that are removed by methods according to the invention by accessing them through the opening 20 or accessing them by optionally removing the bucket top apparatus 10 from the bucket container (not shown) and the buds or flowers are removed from stems by placing a portion of the proximal end of the stem against one or more of a pointed bottom "V" shaped groove 30, a round bottom "V" shaped groove 40 or a more "U" shaped groove 50 that are located along an opening 20 of the apparatus 10 and by drawing the stem from its proximal end to its distal end along and past the groove whereby the edges of the groove catch the buds or flowers along the stem from its proximal to its distal end and strip them from the stem, allowing the buds or flowers to fall into the container. Of course the shape and size of the grooves 30, 40 and 50 are merely illustrative with regard to size and shape, for example, and can be optimized for a particular type of flower or bud that is in need of harvesting. Additionally, the apparatus 10 could have been mounted on a framework instead of being mounted on a container during harvesting to permit the buds or flowers to fall onto a surface as they are harvested and the surface could be stationary or mobile, such as a conveyor belt.

Figure 2:
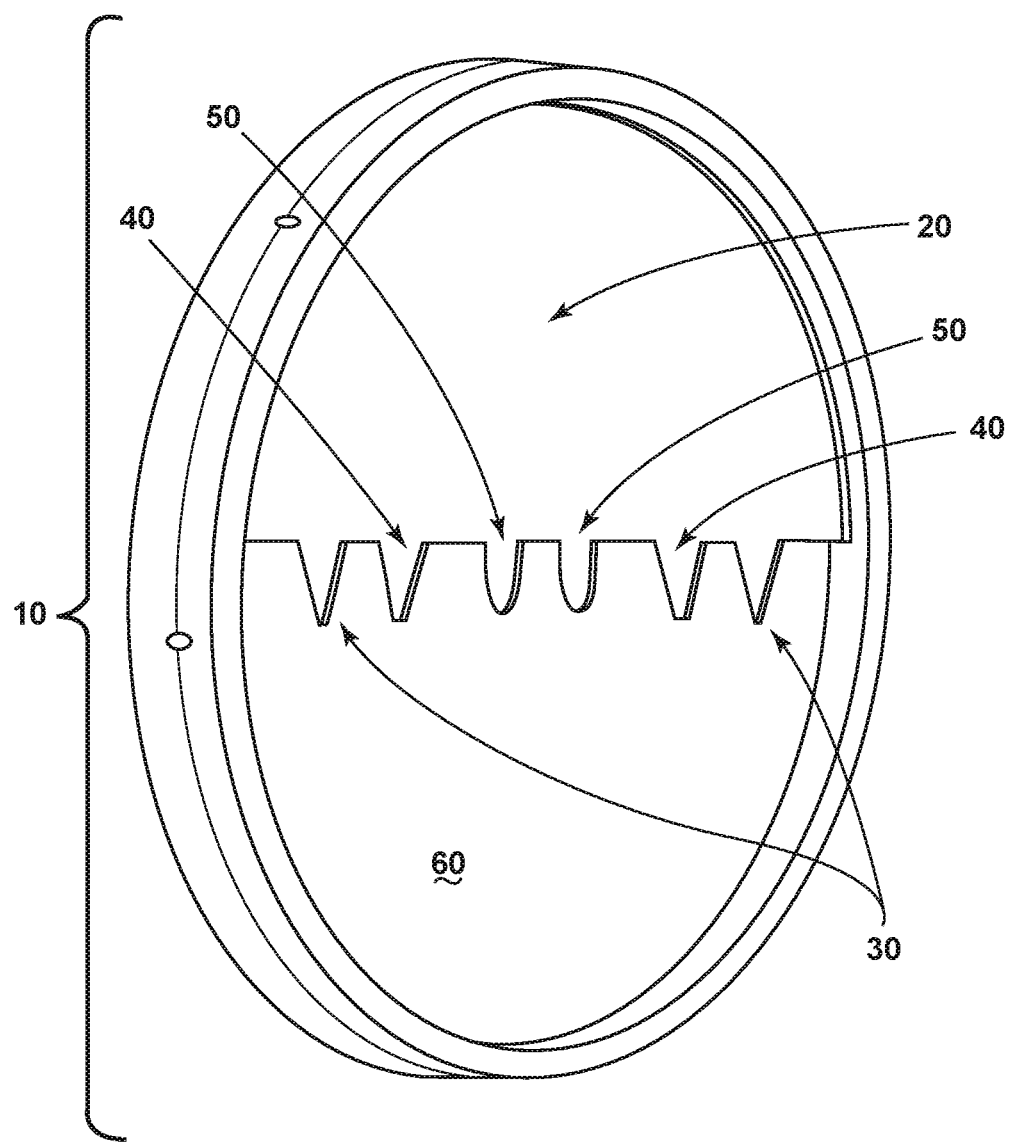
FIG. 2 is an another angular side view of a bucket or container cover device embodiment having a larger hole in the middle of the bucket or container cover for better access to the contents of the bucket or container.

FIG. 2 shows an embodiment of the invention similar to the embodiment in FIG. 1, excepting that the opening 20 is larger in FIG. 2 and shaped differently. Further, the grooves 30, 40, 50 may formed as part of a removable shroud 60 (or shield) member that is shown in FIG. 1 as being integral to the device.

Figure 3:
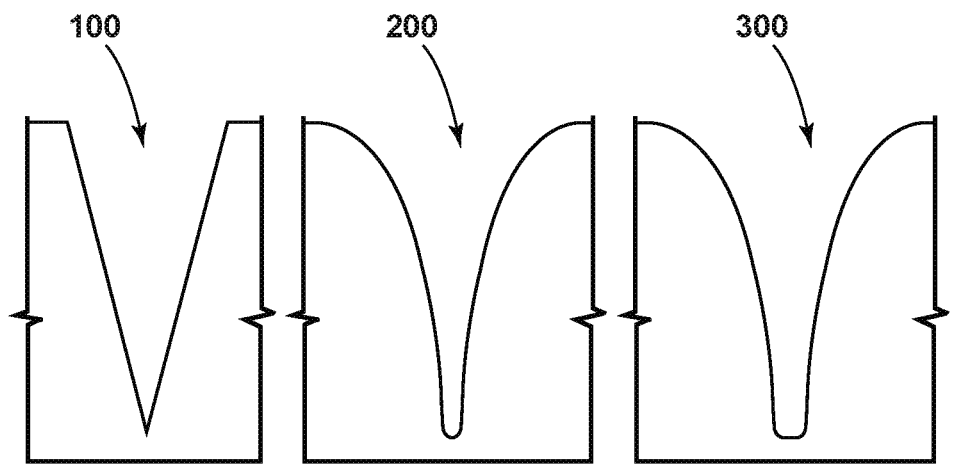
FIG. 3 is a cross sectional view of three differently shaped grooves or notches that can optionally be present in the devices of FIG. 1 or 2 for optimized removal of buds or flowers that have differently shaped or sized stems.

FIG. 3 is an enlarged view of three differently shaped grooves or notches that can optionally be present in the devices of FIG. 1 or 2 for optimized removal of buds or flowers that have differently shaped or sized stems. The groove configuration shape 100 is a substantially "V" shaped with a pointed bottom, wherein the depth of the groove and its width can be varied and one of more of such shapes may optionally included on an apparatus 10 (not shown). The groove configuration shape 200 is a substantially "V" shaped with a round bottom, wherein the depth of the groove and its width can be varied and one of more of such shapes may optionally included on an apparatus 10 (not shown). The groove configuration shape 300 is a substantially "V" shaped with a more square-like bottom, wherein the depth of the groove and its width can be varied and one of more of such shapes may optionally included on an apparatus 10 (not shown). These are non-limiting illustrative shapes and sizes and others may be utilized in the invention, for example a "U" shape or square shape could be used. Moreover, the edges of the grooves may be shaped smooth, jagged, serrated or otherwise optimized for bud or flower removal.

Figure 4:
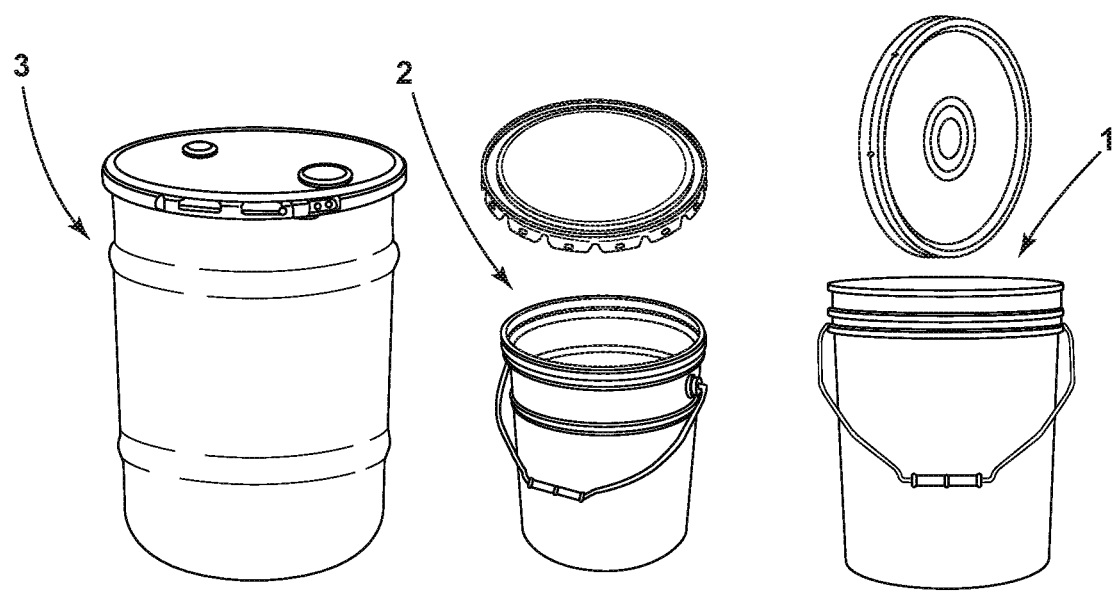
FIG. 4 provides a non-limiting group of sample containers to which a cover, or a flower stripping device as shown and discussed herein may be attached.

FIG. 4 provides a non-limiting group of sample containers that can attach a covering to the container differently or to a device according to the invention. Set 1 is a plastic or ABS bucket and top set in a configuration regularly found at a hardware store. Set 2 is a metallic bucket and top in a configuration regularly found by metal bucket suppliers. Set 3 is a bucket and top in a drum-like configuration that are held together by a removable separate band. Of course other configurations and devices are envisioned for the invention, and even frames instead of containers may be used in an industrial setting for continuous harvesting.

Figure 5:
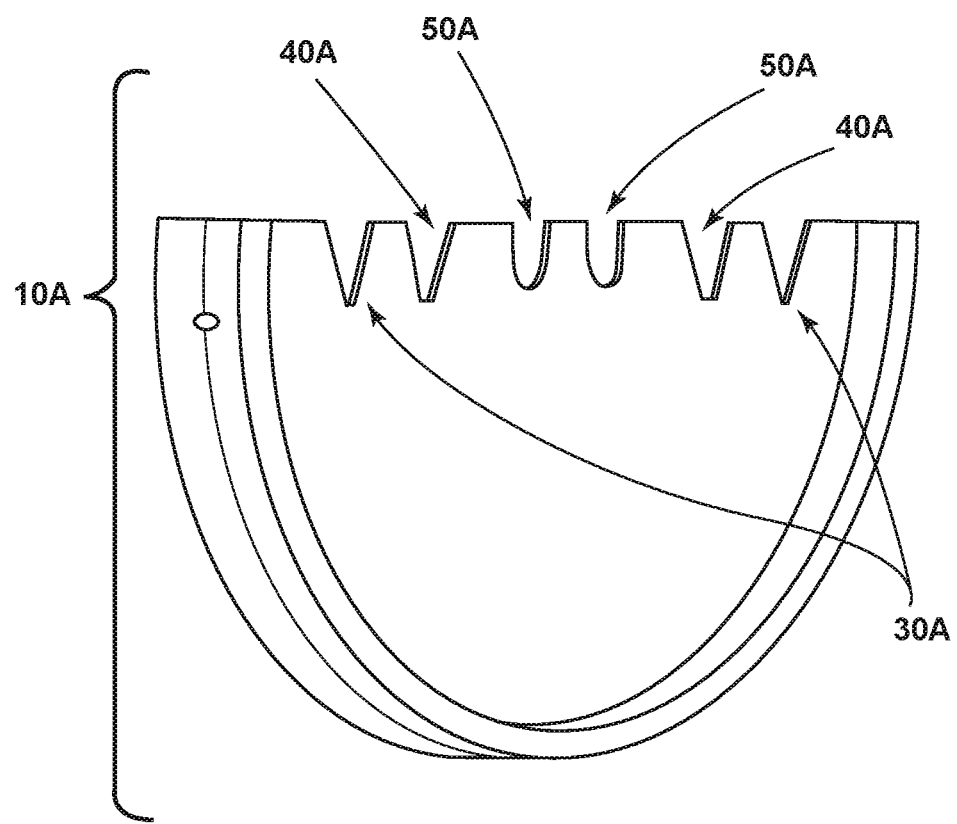
FIG. 5 is another angular side view of a bucket or container cover device embodiment wherein the device is shaped to only attach to substantially half of the bucket or container top.

FIG. 5 is an another angular side view of a bucket or container cover device embodiment similar to embodiments shown in FIGS. 1 and 2 wherein the device is shaped to only be attached to substantially half of a matching bucket or container top. The openings or grooves are numbered and described substantially as described for FIGS. 1 and 2, above.

Figure 6:
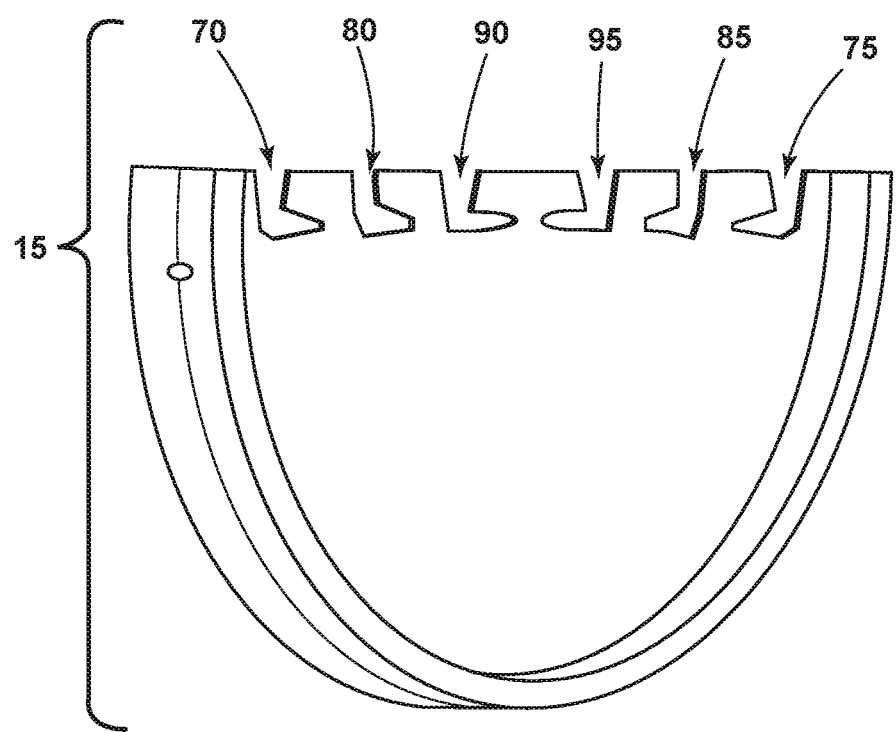
FIG. 6 is another angular side view of a bucket or container cover device embodiment wherein the device is shaped to only attach to substantially half of the bucket or container top and wherein the device is adapted for both right-handed and left-handed use of the device, and the grooves or notches are shaped in an L shape or oblique shape to anchor the stems differently while stripping flowers, buds or leaves from stems of plants.

FIG. 6 is an another angular side view of a bucket or container cover device embodiment according to the invention similar to embodiments shown in FIGS. 1 and 2 wherein the device is shaped to only be attached to substantially half of a matching bucket or container top. The openings or grooves may be described substantially as described for FIGS. 1, 2 and 5, above except that grooves or notches are shaped in an L shape or oblique shape (not shown) to anchor the stems differently while stripping flowers, buds or leaves from stems of plants. The L-shaped grooves or notches 70, 80 and 90 as shown in FIG. 6 as substantially mirror images of L-shaped grooves or notches 75, 85 and 90 of in the drawing. In a preferred embodiment, these grooves or notches can have an oblique shape to allow for a smooth insertion and anchoring of the stems while buds or flowers are being removed.

The various embodiments of the device, shown in FIGS. 1, 2, 5, 8-16 and 24-31 have a variety of different sized notches, both left-handed and right handed, straight and L-shaped. Some embodiments have serrated notches. Serrated notches are particularly efficient for using on green plants in the field, such as freshly harvested *cannabis* plants, as the serrated portions facilitate removal of *cannabis* fan leaves at the base of the leaf stem on the plant's main stalk. The different size notches facilitate different size branches or stalks. For certain notches, the width of the notch tapers from a wide mouth to a narrow throat or terminus. The wider end of the mouth facilitates easy cutting of buds or flowers off of the thicker portion of the stem. As a user draws the stem upwards through the notch the stem slides down to the narrow throat end of the notch to keep cutting the buds and flowers off the stem as the stems become narrower. The straight notches are used for speed on smaller dryer buds and stems as the angled notches facilitate more branches on a stem by locking them in past the angle so they do not easily slide or bounce out of the tight cutting bottom portion of the cutting notch.

Applicant has discovered that use of a flower stripping device such as illustrated and disclosed herein can speed up the bud stripping process for harvest of *cannabis* buds up to 10 fold over bucking by hand with a pair of scissors. In some experiments, Applicant has discovered that use of a flower stripping device such as illustrated and disclosed herein can enable a user to buck 6-8 pounds of *cannabis* per hour, versus approximately one pound per hour using scissors. Moreover, use of the flower stripping device such as illustrated and disclosed herein can make it economical to buck flower stalks with small or few buds that would otherwise not be worthwhile bucking by hand. Currently it is uneconomical to remove all of the smaller buds and flowers by hand use of scissors, due to the cost of labor. With embodiments disclosed herein, a user may now simply pull the stem up through the notches and remove nearly 100% of the buds and flowers easily and quickly without damage to the buds and flowers.

Moreover, compared to the bucking machines currently known, the flower stripping device such as illustrated and disclosed herein has no moving parts, has a self-sharpening cutting edge, is self-cleaning as subsequent stems are drawn through it, uses no electricity and is extremely rugged and durable.

Figure 7:
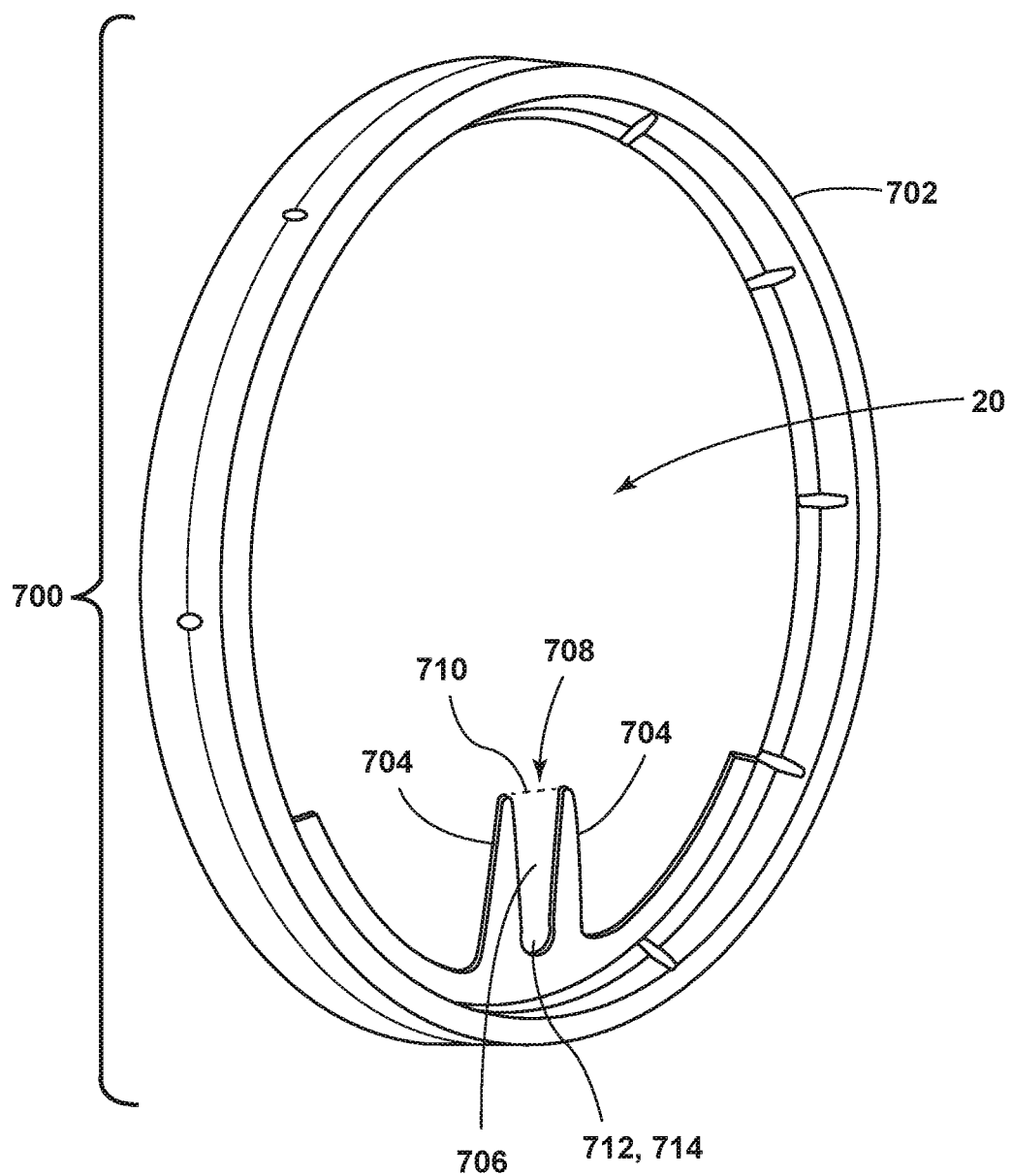
FIG. 7 is an angular side view of a bucket or container cover device embodiment having a pair of opposed blades projecting radially inward from the rim of the device.

With reference to FIG. 7, a flower stripping device 700 is provided. The flower stripping device 700 has a rim 702, which is configured as a circle, but may also be configured as an arc, e.g., a portion of a circle. The rim 702 is configured to be affixable to an edge of a bucket with an open top such as those shown in FIG. 4. The rim 702 forms an opening 20 which will be open to the interior of a bucket when the flower stripping device is affixed to the edge of a bucket. A pair of opposed cutting blades 704 extend radially inward from the rim 702. The pair of opposed cutting blades 704 is configured such that, when the rim 702 is affixed to the edge of a bucket, the pair of opposed cutting blades 704 extends over the open top of the bucket. The pair of opposed cutting blades 704 form a cutting notch 706 which may be used for the flower stripping methods discussed herein.

Another embodiment of a flower stripping device 800 is illustrated in FIGS. 8-18. In certain embodiments, such as shown in FIGS. 8-12, the pair of opposed cutting blades 802 may be integral to, and formed as part of a cutting deck 804 formed into or affixed to and substantially perpendicular to the rim 806. In such embodiments, the cutting blades 802 form a cutting notch 808 in the deck 804.

With respect to FIGS. 7-12, the pair of opposed cutting blades 704, 802 are configured to form an opening 708, 810, with an opening distance 710, 812 measured between a respective edge of each of the pair of opposed cutting blades 704, 802 at the opening 708, and a terminus 712, 814, with a terminus distance 714, 816, measured between a respective edge of each of the pair of opposed cutting blades 704, 802 at the terminus 712, 814, where the opening distance 710, 812 is greater than the terminus distance 714, 816. This configuration provides for a tapering or narrowing of the cutting notch 706, 808 between the opening 708, 810 and the terminus 712, 814. This tapering or narrowing serves a number of purposes. For example, it makes for easier insertion of a flower stem that is full of buds or blooms. The tapering or narrowing also serves to allow the flower stripping device 700, 800 to be used with stems of varying thicknesses, thus providing flexibility. The tapering or narrowing further serves to "lock in" the stem. Specifically, when a stem is stripped in accordance with the methods discussed herein, as part of the insertion of the stem, the user may slide the stem from the opening 708, 810 toward the terminus 712, 814 until both edges of the pair of opposed cutting blades are in contact with the opposed sides of the stem. This ensures that when the user draws the stem upward to perform the stripping, the stem will be in contact with the most edge possible, thereby ensuring a "clean" stripping operation. The tapering or narrowing serves a still further purpose, in that it addresses the issue of a narrowing stem. For most plants, the flower stem is thicker at the bottom of the stem than at the tip of the flower stem. If there are flower buds along the entire length of the narrowing stem, this necessitates a progressively narrower gauge cutting notch. Thus, the tapering or narrowing of the pair of opposed cutting blades or cutting notch enables the stem to slide toward the rim during the drawing step, so that as the flower stem narrows, it is, for the most part, continuously in contact with both edges of the pair of opposed cutting blades, thus ensuring a more efficient stripping operation.

The opening distance 710, 812 may vary in order to address the needs of different sizes and types of flower stems. In one embodiment, the opening distance 710, 812 is at least one inch. In another embodiment the opening distance 710, 812 is at least three-quarters of an inch. In another embodiment, the opening distance 710, 812 is less than or equal to half an inch. In another embodiment, the opening distance 710, 812 is between half an inch and a quarter of an inch.

The terminus 712, 814 may also be various shapes and sizes in order to address the needs of different kinds and sizes of flower stems. In certain embodiments, the terminus 712, 814 is a pointed bottom V-shape and the terminus distance 714, 816 is zero, e.g., the lines formed by the edges intersect at a point. In another embodiment, the terminus 712, 814 is a round bottom U-shape or round bottom V-shape and the terminus distance 714, 816 is at least one-sixteenth of an inch. In another embodiment, the terminus 712, 814 is a round bottom U-shape or round bottom V-shape and the terminus distance 714, 816 is between one-sixteenth of an inch and an eighth of an inch.

In another embodiment, the pair of opposed cutting blades 704, 818 and/or the cutting notch 808 is configured so that the opening distance 820 is less than the terminus distance 822, e.g., the terminus 824 is wider than the opening. In certain further embodiments, the terminus 824 is serrated. This serrated terminus 824 is particularly useful in stripping flower buds from green or just harvested flower stems, where the vegetation is tougher and would require the use of more force if the flower stem was stripped using the other sized and shaped cutting blades or cutting notches discussed herein.

Embodiments of the flower stripping device discussed herein may be made of a variety of substances, or combinations of substances so long as they are sharp or rigid enough to accomplish the flower stripping operation. For example, the flower stripping device may be made of plastic, metal, rigid or semi-rigid polymer, or a combination thereof. In one embodiment, the rigid or semi-rigid polymer is an ABS or PVC polymer.

With reference to FIGS. 8, 9, 17 and 18, embodiments of the flower stripping device 800 may be attached to the edge of a bucket in a variety of different ways, including Velcro, magnets, glue, tape, buttons, screws, clips, snaps, snap fittings, or other attachment means known to those skilled in the art. Such attachment devices are referred to herein as "attachment means." In one embodiment, illustrated in FIG. 18, the rim 806 simply fits over the edge (not shown) of a bucket. In another embodiment, illustrated in FIG. 18, the rim 806 includes one or more small projections 826, which serve to snap onto an edge or lip of a bucket (not shown). For example, but without limitation, buckets commonly sold at home improvement stores (such as Home Depot or Lowes) and which are referred to as "5 gallon buckets" typically have a lip or edge for attaching a lid to the bucket. The rim 806 of the flower stripping device 800 can be configured such that the one or more small projections 826 will snap onto and hold fast to the lip or edge of such a five gallon bucket. Similar configurations may also be configured to attach the rim 806 to other lips, edges, or snaps of buckets of other standard configurations, such as those commonly used and sold in various markets in Europe, such as for example, a 20 liter bucket. In both embodiments, a series of vent holes 828 serve to release air as the flower stripping device 800 is pressed onto the bucket edge, e.g., preventing a "burp" of air, and simplifies the act of attachment.

Figure 8:
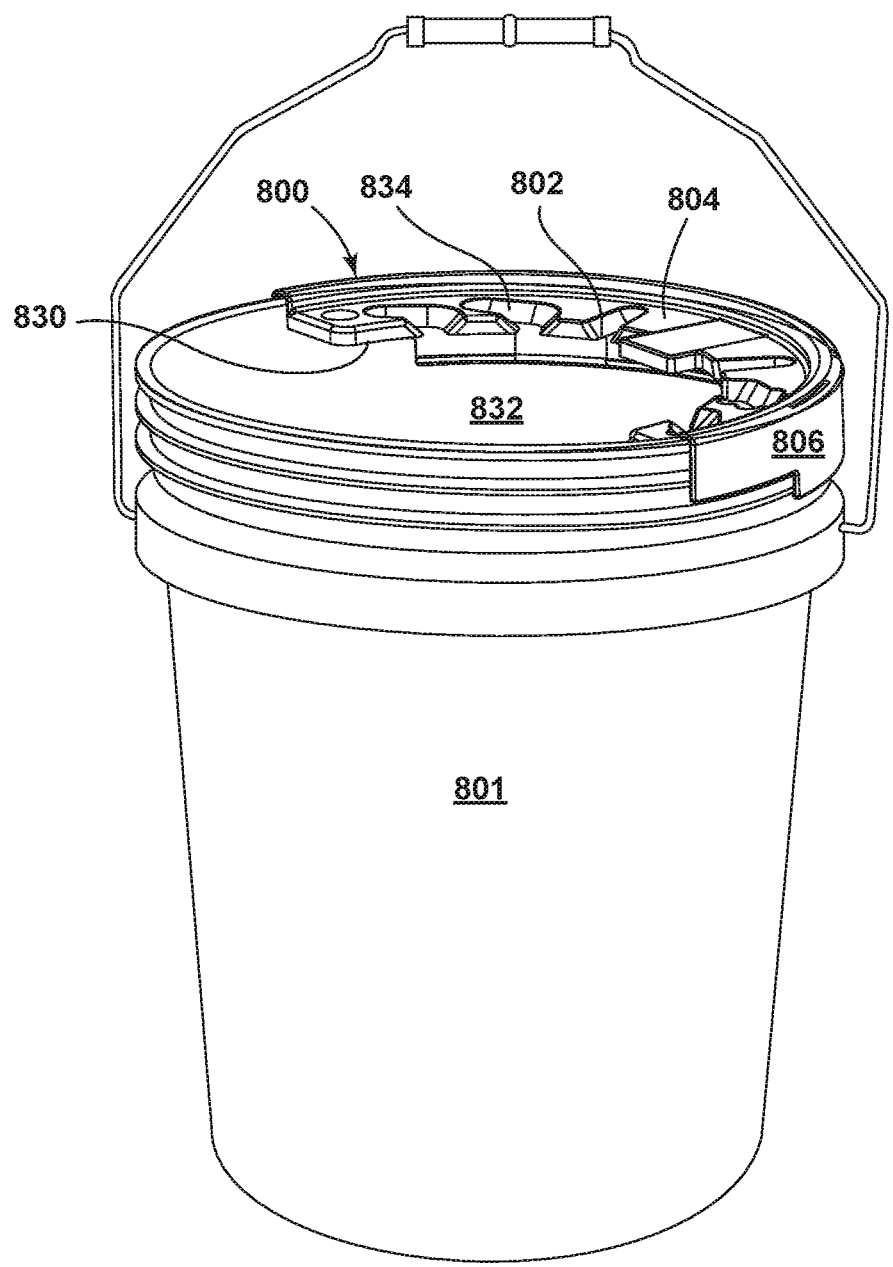
FIG. 8. is a perspective view of an embodiment of the bucket or container device affixed in place on the edge of a bucket and ready for use.
Figure 9:
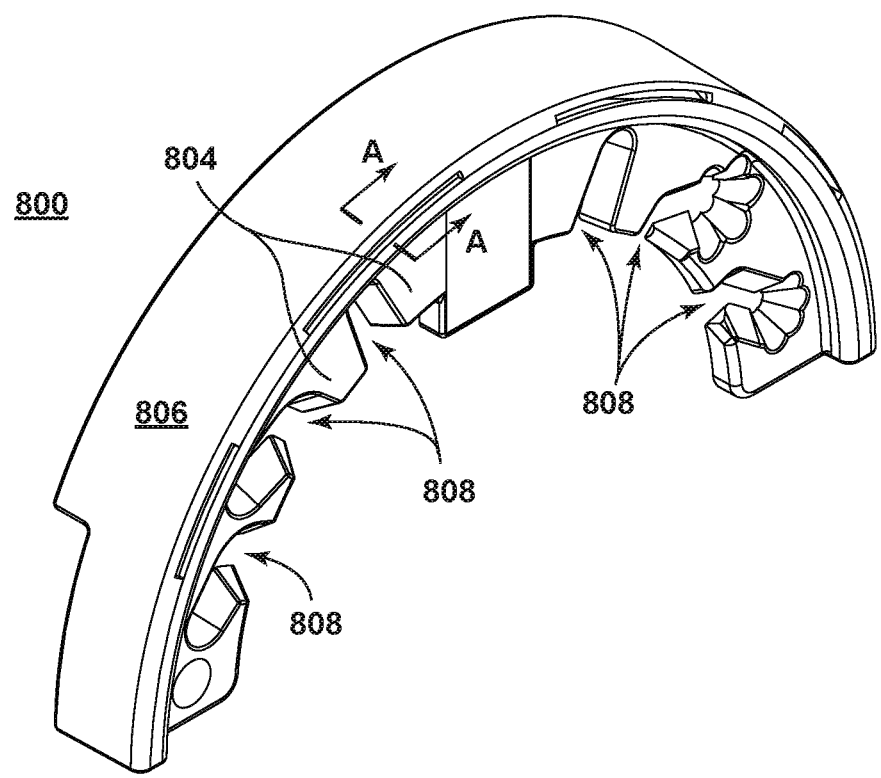
FIG. 9 is a front perspective view of the embodiment of the flower stripping device of FIG. 8.
Figure 10:
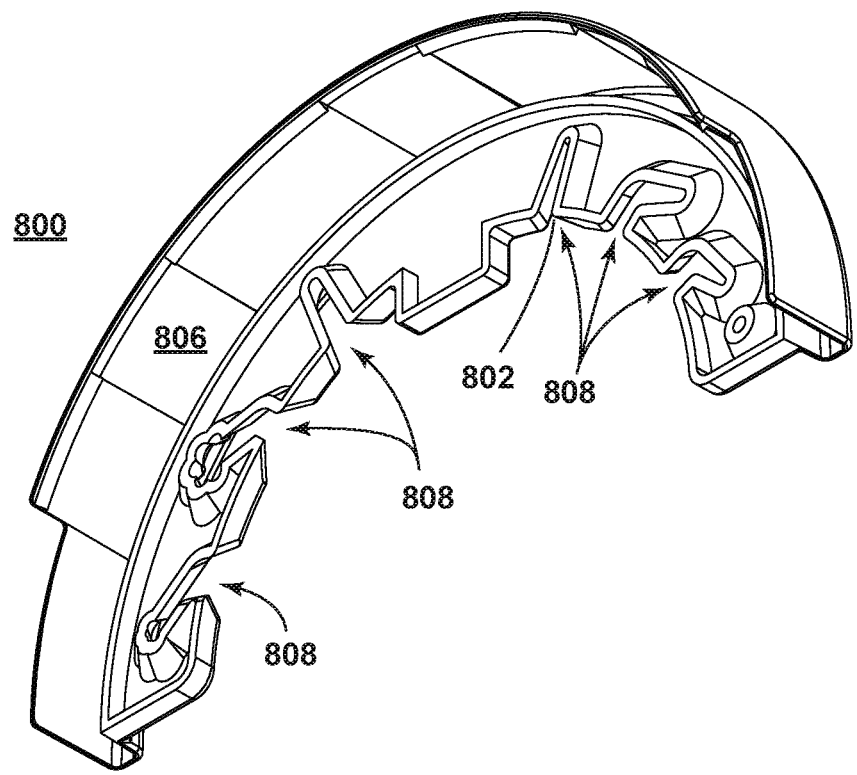
FIG. 10 is a rear perspective of the embodiment of the flower stripping device of FIG. 8.
Figure 11:
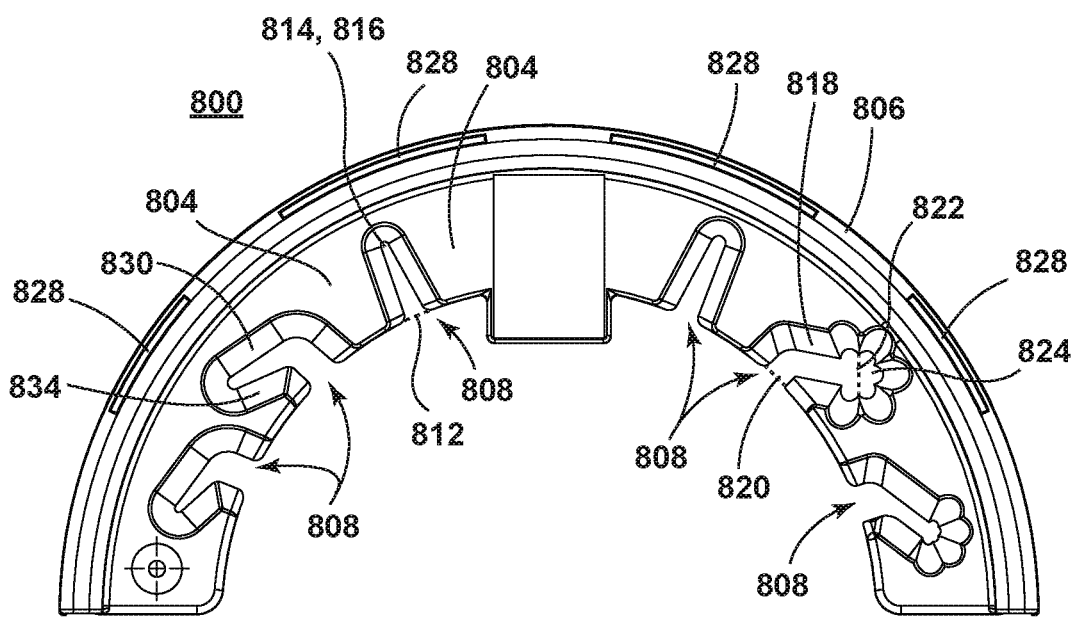
FIG. 11 is a front view of the embodiment of the flower stripping device of FIG. 8.
Figure 12:
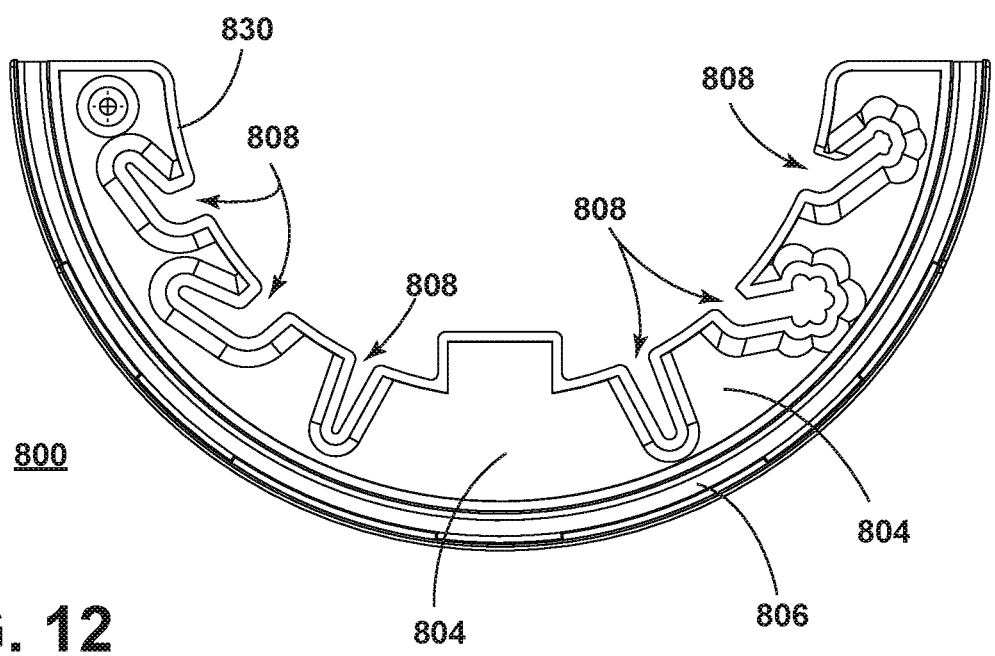
FIG. 12 is a rear view of the embodiment of the flower stripping device of FIG. 8.
Figure 13:
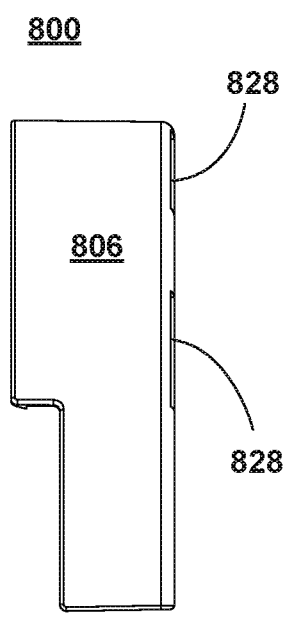
FIG. 13 is a left side view of the embodiment of the flower stripping device of FIG. 8.
Figure 14:
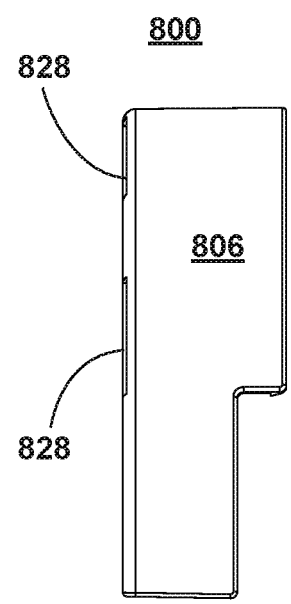
FIG. 14 is a right side view of the embodiment of the flower stripping device of FIG. 8.
Figure 15:
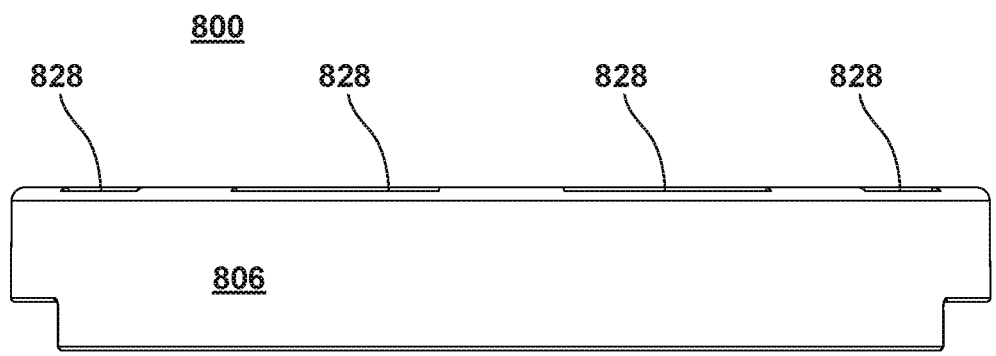
FIG. 15 is a top view of the embodiment of the flower stripping device of FIG. 8.
Figure 16:
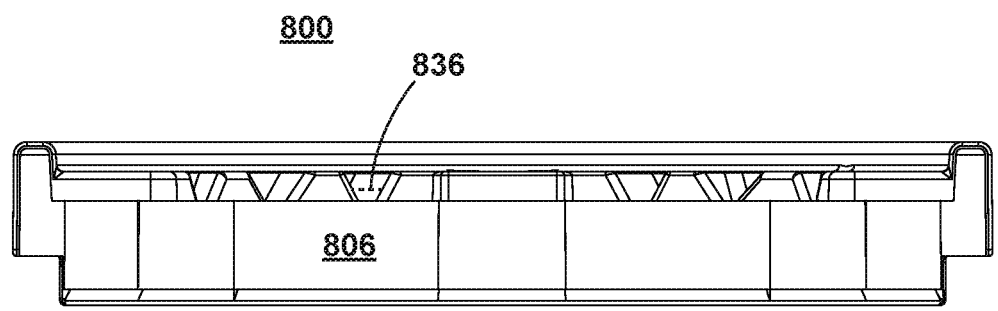
FIG. 16 is a bottom view of the embodiment of the flower stripping device of FIG. 8.
Figure 17:
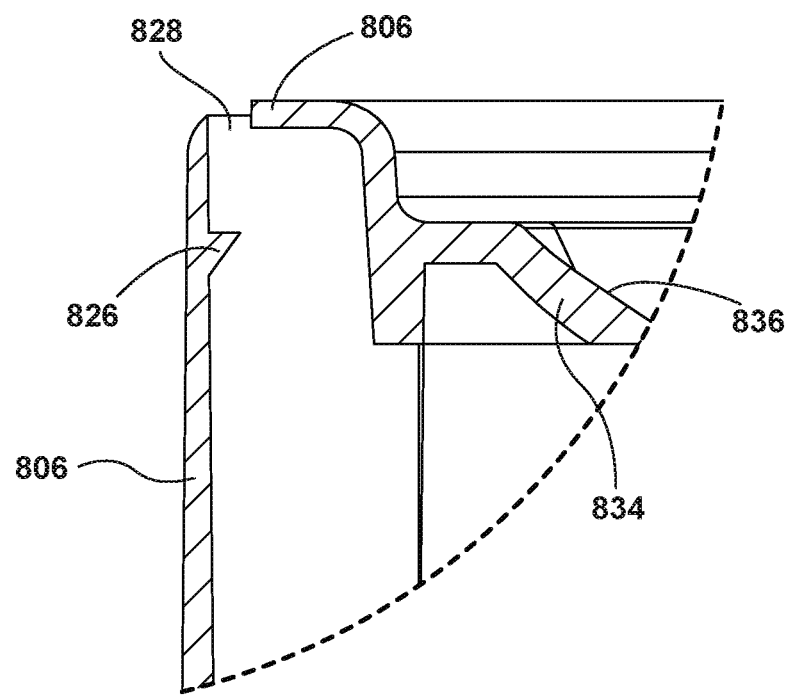
FIG. 17 is a cutaway view of an embodiment of the flower stripping device of FIG. 9, along the line A-A, illustrating one embodiment of the structure for attaching the rim of the flower stripping device to the edge of a bucket.
Figure 18:
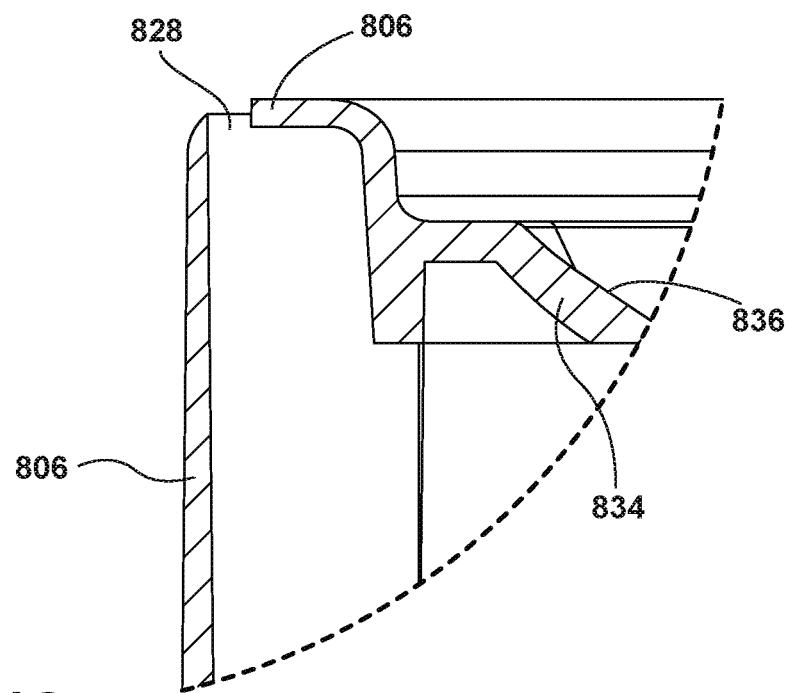
FIG. 18 is a cutaway view of an embodiment of the flower stripping device of FIG. 9, along the line A-A, illustrating another embodiment of the structure for attaching the rim of the flower stripping device to the edge of a bucket.

In certain embodiments, the rim 806 of the flower stripping device 800 is a circle or arc having a first radius and the rim 800 is sized to be affixable to an edge of a bucket having a second radius, where the first radius and the second radius are substantially the same. A cutting deck 804 extends radially inward from the rim 806, as illustrated in FIGS. 8, 11 and 12. The cutting deck 804 has an interior edge 830, and is configured such that, when the rim 806 is affixed to the edge of the bucket 801, the interior edge 830 of the cutting deck 804, in conjunction with the edge of the bucket 801, forms an opening 832 to an interior of the bucket 801. The interior edge 830 of the cutting deck 804 is further configured to form at least one cutting notch 808 extending from the opening 832 and toward the rim 806. The interior edge 830 of the cutting deck 804 may be configured to form a plurality of cutting notches 808, with a variety of shapes and sizes. For example, the at least one cutting notch may be a pointed bottom V-shaped notch, a round bottom V-shaped notch, a U-shaped notch, or an L-shaped notch. Such cutting notches may also be serrated, either at their terminus, or along their entire length.

In certain embodiments, the at least one cutting notch 808 is formed with a sidewall 834 extending outwardly from the interior edge 830, so that the sidewall 834 forms an angled bevel 836. This angled bevel 836 advantageously provides a guide to enable the user to angle the flower stem to increase the cutting efficiency of the edges of the beveled cutting notch 808, 836. The bevel 836 as illustrated in FIGS. 9-18 is angled at forty-five degrees with respect to the cutting deck 804. However, other angles may be used, such as any angle between 20 and 90 degrees, such as 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees and 90 degrees, e.g., normal to the cutting deck.

Figure 19:
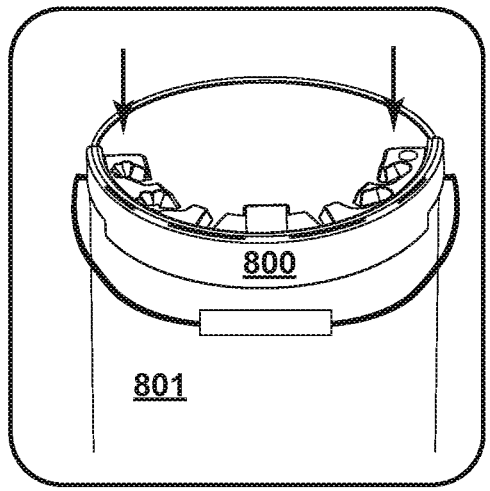
FIGS. 19-22 illustrate a method for use of an embodiment of the flower stripping device of FIG. 8.
Figure 20:
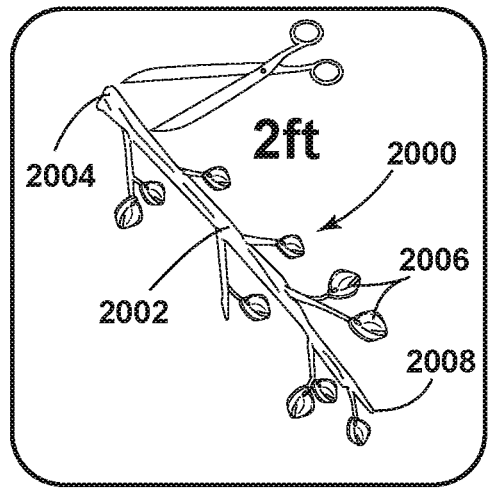
Figure 21:
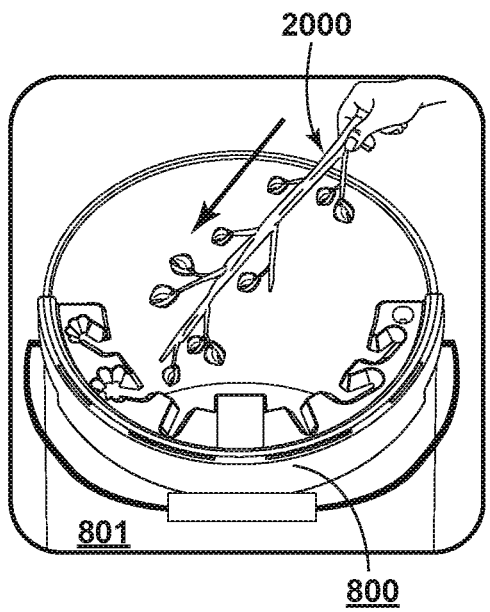
Figure 22:
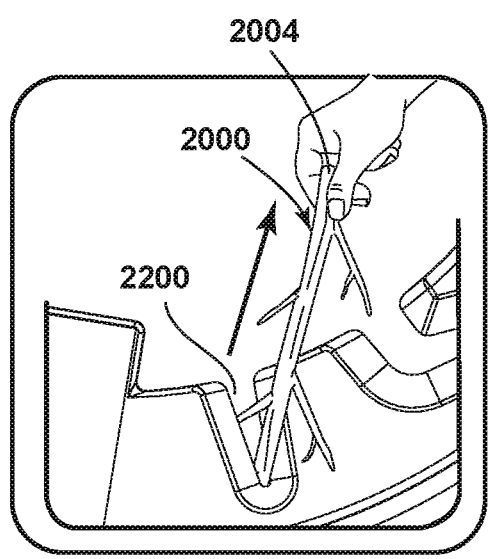
Figure 23:
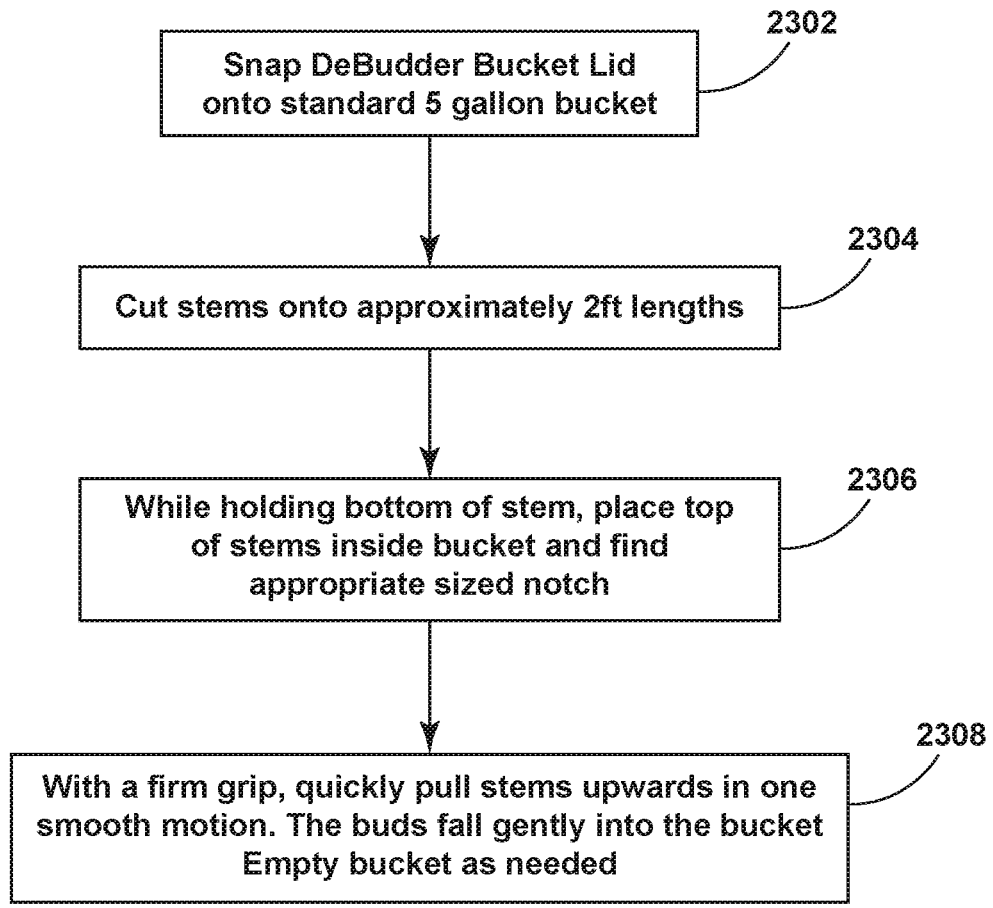
FIG. 23 is a flowchart illustrating a method of use for an embodiment of the flower stripping device disclosed herein.
Figure 24:
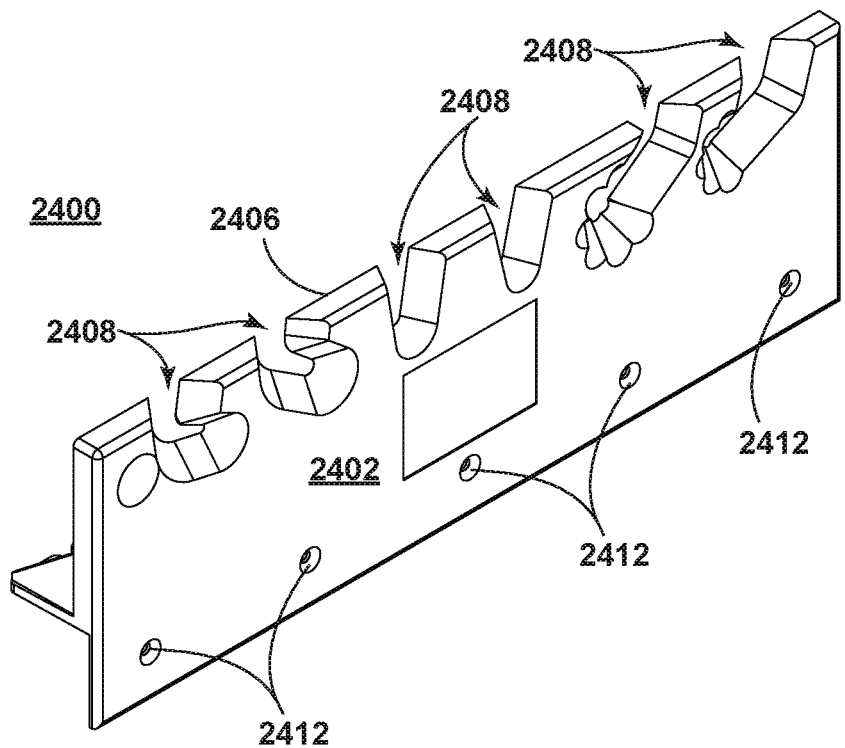
FIG. 24 is a front perspective view of another embodiment of the flower stripping device for attachment to the edge of a flat surface, such as a work bench.

With respect to FIGS. 19-23, a method of use 2300 of the flower stripping devices is illustrated. In FIG. 19, and step 2302 of FIG. 23, a flower stripping device 800 (also referred to commercially by the Applicant as a "DeBudder Bucket Lid™") is snapped or affixed onto the edge of a 5 gallon bucket 801, by a user, in place of the lid normally provided with such a bucket 801. In FIG. 20, and step 2304 of FIG. 23, the user selects a flower stem 2000, which has a stem portion 2002, a cut end 2004, a flower 2006, and a flower end 2008. The flower stem 2000 is preferably cut to a length to easily fit in the bucket 801. For a 5 gallon bucket, a two foot length of stem is preferred, but measurements need not be exact. In FIG. 21 and step 2306 of FIG. 23, the user selects the appropriately sized cutting notch or cutting blades in view of the width of the flower stem 2000, the type of plant, the toughness of the stem, and/or whether the stem is dried or green. The user then inserts, in the direction of the arrow, and positions the flower stem 2000 such that the stem portion 2002 is in the cutting notch 2200 or between the pair of opposed cutting blades and the cut end 2004 of the flower stem 2000 is proximal to the upper side of the cutting notch 2200 or pair of opposed cutting blades and the flower end 2008 is inside the bucket 801. In FIG. 22 and step 2308 of FIG. 23, the user draws the flower stem 2000, through the selected cutting notch 2200 or pair of opposed cutting blades in the direction shown by arrow, to detach and remove the flower 2006 from the flower stem 2000.

Use of the flower stripping device 800 attached to a bucket 801 makes it easy to catch the stripped buds or flowers 2006 in the bucket 801. Further, embodiments with the semi-circle or arc design facilitate easily dumping out the buds or flowers from the bucket without requiring removal of the flower stripping device from the bucket.

With reference to FIGS. 25-31, another embodiment of the flower stripping device 2400, for attachment to a fixed surface, such as the edge of a table or workbench, is provided. The flower stripping device 2400 includes a cutting plate 2402 and a support plate 2404, extending outwardly from the cutting plate 2402. The cutting plate 2402 has a top edge 2406, and the top edge 2406 is configured to form at least one cutting notch 2408. The cutting plate 2402 may include a plurality of cutting notches 2408.

The support plate 2404 (FIG. 28) is substantially perpendicular to the back side 2410 of the cutting plate 2402. In certain embodiments, the cutting plate 2402 may be affixed to a flat surface. For example, the device illustrated in FIG. 24 has a plurality of attachment holes 2412 in the cutting plate 2402, allowing the cutting plate 2402 to be screwed, nailed, or otherwise affixed to the front edge of a flat surface such as a work bench. Such attachment holes 2412 and corresponding screws or nails may be understood to be a means for affixing the flower stripping device 2400 to a flat surface. In other embodiments, the support plate 2404 (FIG. 28) may be affixed to a flat surface. For example, the device illustrated in FIG. 25 has a plurality of attachment holes 2414 or slots in the support plate 2404, allowing the support plate 2404 to be screwed, nailed or otherwise affixed to the top edge of a flat surface such as a work bench. Such holes 2414 or slots and corresponding screws or nails may also be understood to be a means for affixing the flower stripping device 2400 to a flat surface. In certain further embodiments, attachment holes or slots may be provided on both the cutting plate 2402 and the support plate 2404.

Figure 25:
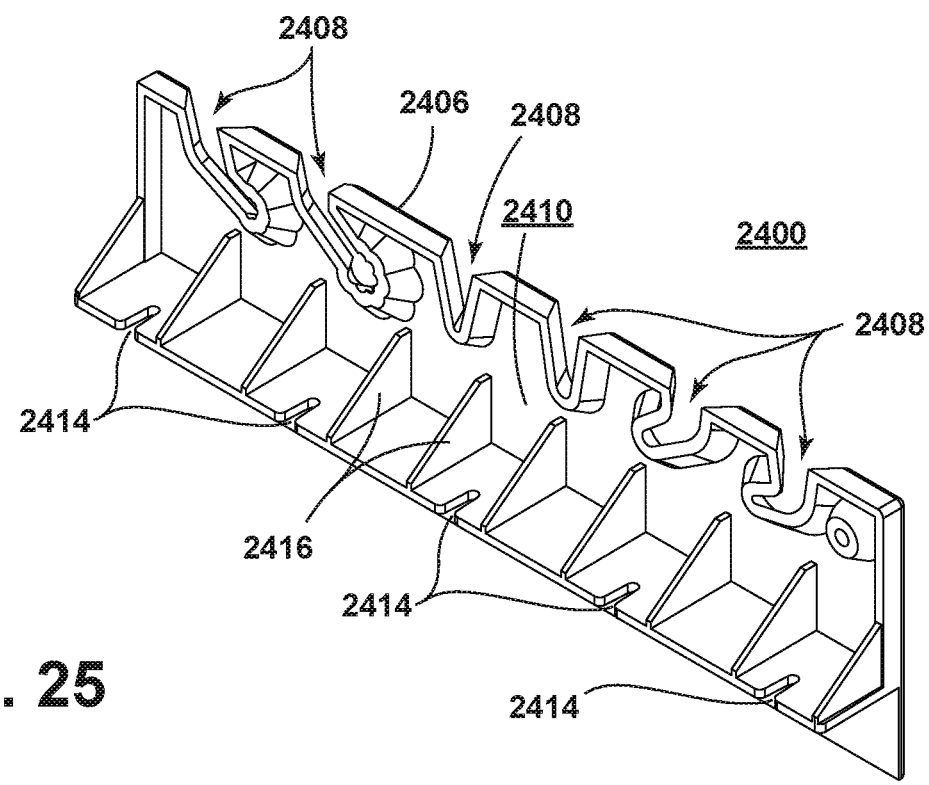
FIG. 25 is a rear perspective view of the embodiment of the flower stripping device of FIG. 24.
Figure 26:
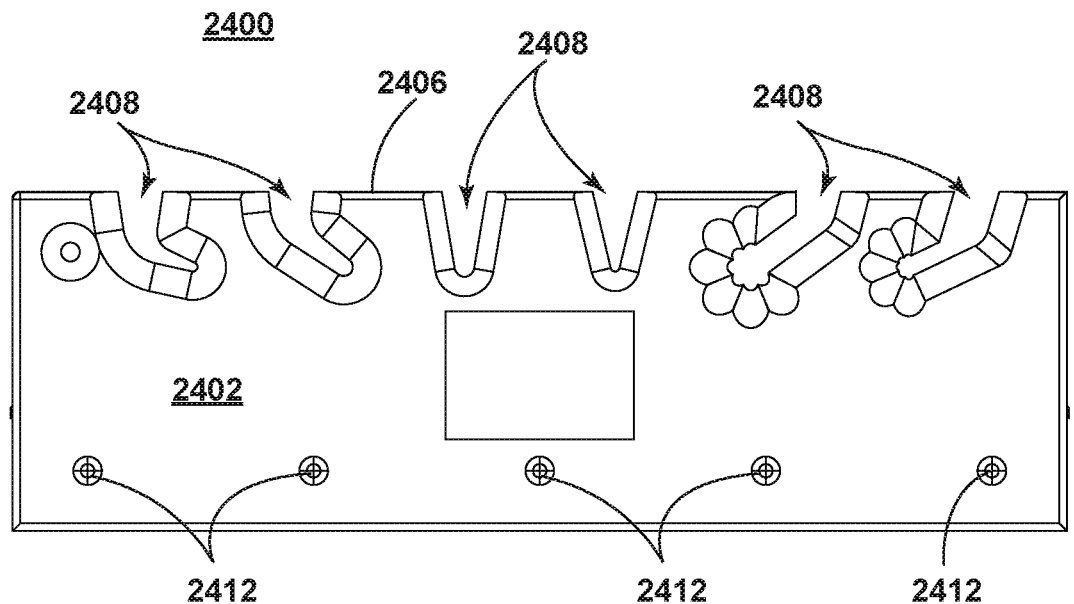
FIG. 26 is a front view of the embodiment of the flower stripping device of FIG. 24.
Figure 27:
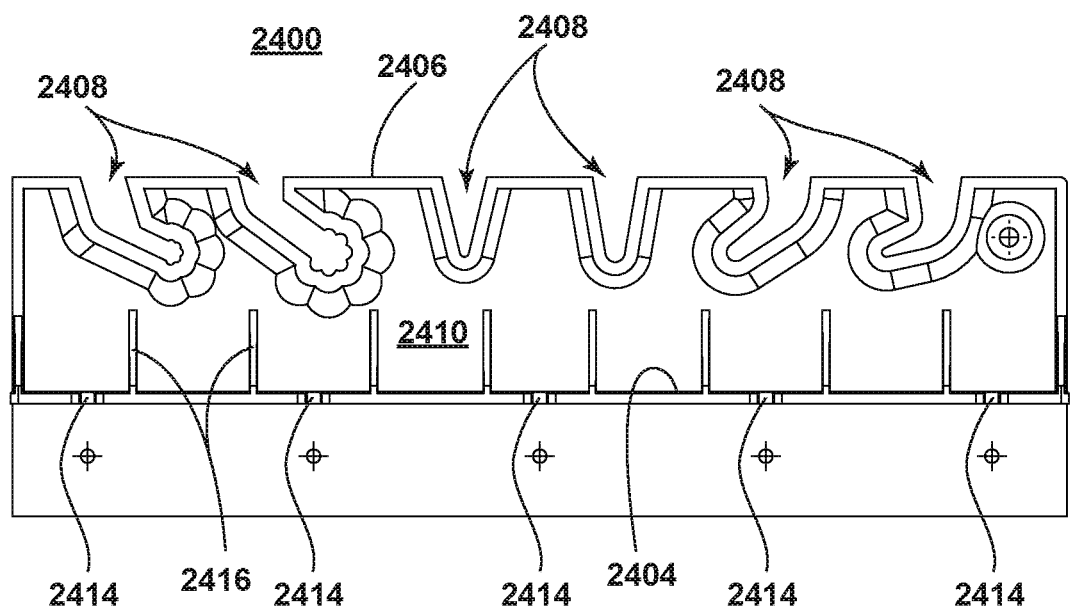
FIG. 27 is a rear view of the embodiment of the flower stripping device of FIG. 24.
Figures 28, 29:
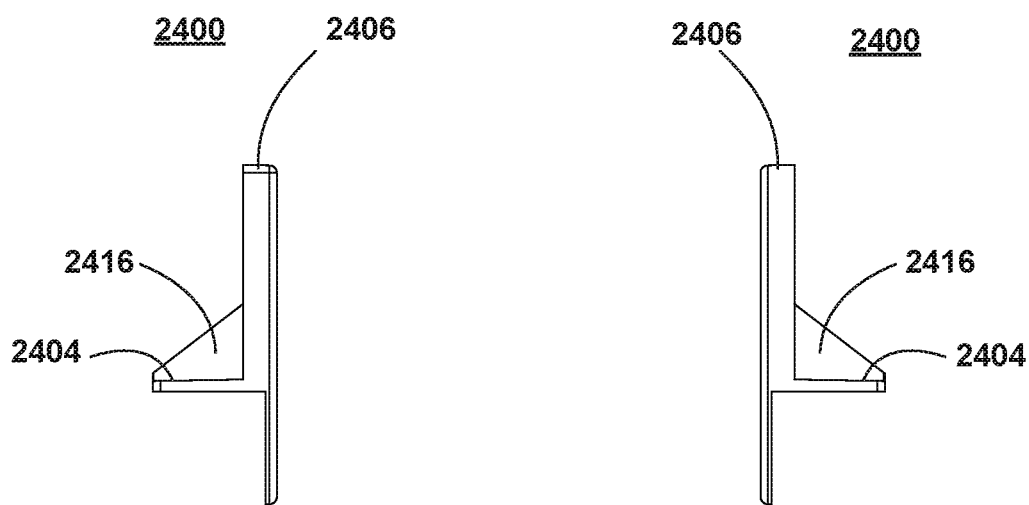
FIG. 28 is a left side view of the embodiment of the flower stripping device of FIG. 24.
FIG. 29 is a right side view of the embodiment of the flower stripping device of FIG. 24.
Figure 30:
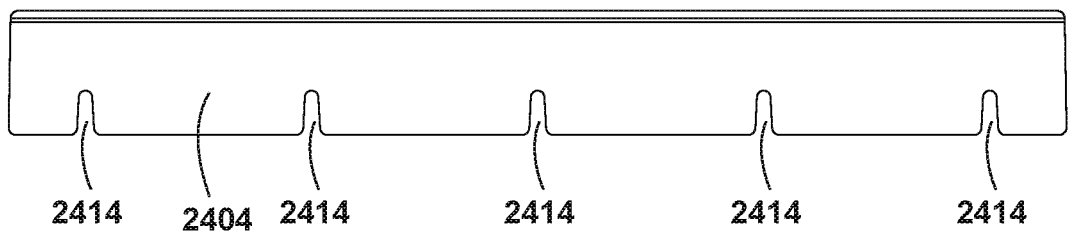
FIG. 30 is a bottom view of the embodiment of the flower stripping device of FIG. 24.
Figure 31:
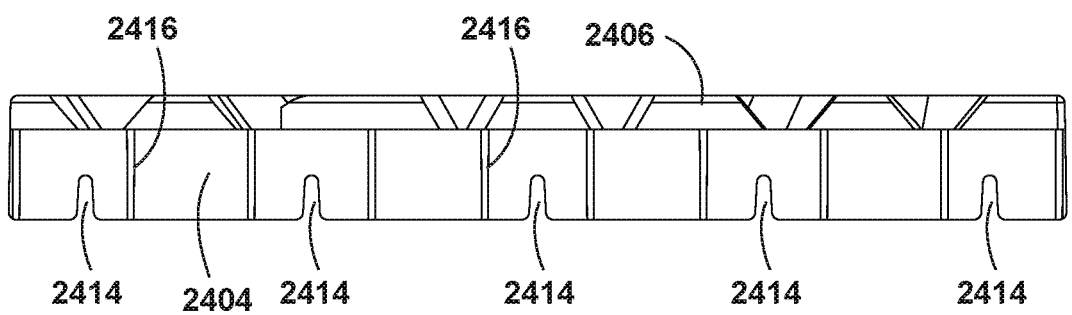
FIG. 31 is a top view of the embodiment of the flower stripping device of FIG. 24.

With reference to FIG. 25, certain embodiments include buttresses 2416, integral to and generally normal to the support plate 2404 and the cutting plate 2402. These buttresses 2416 serve to increase the strength of the flower stripping device 2400 and increase the amount of force that can be used when drawing a stem through a cutting notch 2408.

As illustrated in FIGS. 24-31, much like the flower stripping device for attachment to a bucket, the flower stripping device 2400 for attachment to a flat surface may have a variety of different sized and shaped cutting blades or cutting notches, which may be tapered, straight, serrated, or beveled, and which may have variously shaped and sized openings and termini. Further, the flower stripping device for attachment to a flat surface may be made of a variety of materials, or combinations of materials, including plastic, metal, rigid or semi-rigid polymer. The rigid or semi-rigid polymer may be an ABS or PVC polymer.

The flower stripping device of FIGS. 24-31 can also be affixed to any flat surface. For example, the device could be affixed to a wooden beam or plank, such as a "2×4." Then, the wooden plank can be placed or mounted over a large bin, a chute, or a drop cloth to catch the buds or flowers as they are stripped. This described use allows for a user to pull very long stems through the device. By doing so, the user avoids the need to cut stems into segments to strip them with the bucket lid embodiments disclosed herein.

Other aspects and advantages of the present invention will become apparent from the above detailed description, as illustrated by way of example of the principles of the invention. The scope of the invention is to be defined by the claims appended hereto and by their equivalents.

What is claimed is:

1. A flower stripping device comprising:
 a rim;
 wherein the rim is configured as an arc or circle and further configured to be affixable to an edge of a bucket with an open top;
 a pair of opposed cutting blades extending radially inward from the rim;
 wherein the pair of opposed cutting blades is configured such that, when the rim is affixed to the edge of the bucket, the pair of opposed cutting blades extends over the open top of the bucket;
 wherein the pair of opposed cutting blades are configured to form an opening, with an opening distance measured between a respective edge of each of the pair of opposed cutting blades at the opening, and a terminus, with a terminus distance, measured between a respective edge of each of the pair of opposed cutting blades at the terminus;
 wherein the opening distance is greater than the terminus distance;

wherein the pair of opposed cutting blades are configured to form an opening, with an opening distance measured between a respective edge of each of the pair of opposed cutting blades at the opening, and a terminus, with a terminus distance, measured between a respective edge of each of the pair of opposed cutting blades at the terminus;

wherein the opening distance is greater than the terminus distance; and wherein the opening distance is at least three-quarters of an inch.

2. The flower stripping device of claim 1 wherein the pair opposed cutting blades comprise a cutting notch formed in a deck affixed to and substantially perpendicular to the rim.

3. The flower stripping device of claim 1 wherein opening distance is at least one inch.

4. The flower stripping device of claim 1 wherein the terminus is a pointed bottom V-shape and the terminus distance is zero.

5. The flower stripping device of claim 1 wherein the terminus is a round bottom U-shape and the terminus distance is at least one-sixteenth of an inch.

6. The flower stripping device of claim 1 wherein the terminus is a round bottom U-shape and the terminus distance is between one-sixteenth of an inch and an eighth of an inch.

7. The flower stripping device of claim 1 wherein the pair of opposed cutting blades are configured to form an opening, with an opening distance measured between a respective edge of each of the pair of opposed cutting blades at the opening, and a terminus, with a terminus distance, measured between a respective edge of each of the pair of opposed cutting blades at the terminus; and wherein the opening distance is less than the terminus distance.

8. The flower stripping device of claim 1 wherein the terminus is serrated.

9. The flower stripping device of claim 1 wherein the device comprises plastic, metal, rigid or semi-rigid polymer, or a combination thereof.

10. The flower stripping device of claim 9 wherein the rigid or semi-rigid polymer is an ABS or PVC polymer.

11. The flower stripping device of claim 1 wherein the rim further comprises a snap configured to attach the rim to the bucket.

12. A flower stripping device comprising:
a rim;
wherein the rim is configured as an arc or circle having a first radius;
wherein the rim is configured to be affixable to an edge of a bucket having a second radius;
wherein the first radius and the second radius are substantially the same;
a cutting deck extending radially inward from the rim;
wherein the cutting deck comprises an interior edge;
wherein the cutting deck is configured such that, when the rim is affixed to the edge of the bucket, the interior edge of the cutting deck forms an opening to an interior of the bucket; and
wherein the interior edge of the cutting deck is further configured to form at least one cutting notch extending from the opening and toward the rim; and
wherein the width of the at least one cutting notch, measured at the opening, is at least at least three-quarters of an inch.

13. The flower stripping device of claim 12 wherein the interior edge of the cutting deck is configured to form a plurality of cutting notches.

14. The flower stripping device of claim 12 wherein the at least one cutting notch comprises a pointed bottom V-shaped notch.

15. The flower stripping device of claim 12 wherein the at least one cutting notch comprises a round bottom V-shaped notch.

16. The flower stripping device of claim 15 wherein the terminus is a pointed bottom V-shape and the terminus distance is zero.

17. The flower stripping device of claim 15 wherein the terminus is a round bottom V-shape and the terminus distance is at least one-sixteenth of an inch.

18. The flower stripping device of claim 15 wherein the terminus is a round bottom V-shape and the terminus distance is between one-sixteenth of an inch and an eighth of an inch.

19. The flower stripping device of claim 12 wherein the at least one cutting notch comprises a U-shaped notch.

20. The flower stripping device of claim 12 wherein the at least one cutting notch comprises an L-shaped notch.

21. The flower stripping device of claim 12 wherein the interior edge configured to form the least one cutting notch is serrated.

22. The flower stripping device of claim 12 wherein the at least one cutting notch comprises an opening and a terminus and wherein the width of the at least one cutting notch tapers from the opening to the terminus.

23. The flower stripping device of claim 12 wherein the width of the at least one cutting notch, measured at the opening, is at least one inch.

24. The flower stripping device of claim 12 wherein the at least one cutting notch further comprises:
a sidewall extending outwardly from the interior edge wherein the sidewall is configured to form a bevel.

25. The flower stripping device of claim 24 wherein the bevel is angled at forty-five degrees with respect to the cutting deck.

26. The flower stripping device of claim 12 wherein the device comprises plastic, metal, rigid or semi-rigid polymer, or a combination thereof.

27. The flower stripping device of claim 26 wherein the rigid or semi-rigid polymer is an ABS or PVC polymer.

28. The flower stripping device of claim 12 wherein the rim further comprises a snap configured to attach the rim to the bucket.

29. A flower stripping device for mounting on a fixed surface comprising:
a cutting plate;
a support plate;
wherein the support plate extends outwardly from the cutting plate;
wherein the cutting plate has a top edge; and
wherein the top edge is configured to form at least one cutting notch; and
wherein the width of the at least one cutting notch, measured at the opening, is at least three quarters of an inch.

30. The flower stripping device of claim 29 wherein the top edge is configured to form a plurality of cutting notches.

31. The flower stripping device of claim 29 wherein the support plate is substantially perpendicular to the back side of the cutting plate.

32. The flower stripping device of claim 29 wherein the cutting plate has a means for affixing the flower stripping device to a flat surface.

33. The flower stripping device of claim 29 wherein the means for affixing the flower stripping device comprises a plurality of attachment holes.

34. The flower stripping device of claim 29 wherein the support plate has a means for affixing the flower stripping device to a flat surface.

35. The flower stripping device of claim 29 wherein the means for affixing the flower stripping device comprises a plurality of attachment holes.

36. The flower stripping device of claim 29 wherein the at least one cutting notch comprises a pointed bottom V-shape notch.

37. The flower stripping device of claim 29 wherein the at least one cutting notch comprises a round bottom V-shape notch.

38. The flower stripping device of claim 29 wherein the at least one cutting notch comprises a U-shaped notch.

39. The flower stripping device of claim 29 wherein the at least one cutting notch comprises an L-shaped notch.

40. The flower stripping device of claim 29 wherein the interior edge configured to form the least one cutting notch is serrated.

41. The flower stripping device of claim 29 wherein the at least one cutting notch comprises an opening and a terminus and wherein the width of the at least one cutting notch tapers from the opening to the terminus.

42. The flower stripping device of claim 29 wherein the width of the at least one cutting notch, measured at the opening, is at least at least one inch.

43. The flower stripping device of claim 29 wherein the at least one cutting notch further comprises:
  a sidewall extending outwardly from the interior edge; and
  wherein the sidewall is configured to form a bevel.

44. The flower stripping device of claim 43 wherein the bevel is angled at forty-five degrees.

45. The flower stripping device of claim 29 wherein the device comprises plastic, metal, rigid or semi-rigid polymer, or a combination thereof.

46. The flower stripping device of claim 45 wherein the rigid or semi-rigid polymer is an ABS or PVC polymer.

47. A method for removing a flower from a flower stem, using a flower stripping device comprising a rim, wherein the rim is configured as an arc or circle and further configured to be affixable to an edge of a bucket with an open top, a pair of opposed cutting blades extending radially inward from the rim, wherein the pair of opposed cutting blades is configured such that, when the rim is affixed to the edge of the bucket, the pair of opposed cutting blades extends over the open top of the bucket, the method comprising:
  affixing the rim to the edge of the bucket;
  selecting the flower stem, wherein the stem comprises a stem portion, a cut end, a flower, and a flower end;
  positioning the flower stem such that the stem portion is between the pair of opposed cutting blades and the cut end of the flower stem is proximal to the upper side of the pair of opposed cutting blades and the flower end is inside the bucket; and
  drawing the flower stem through the pair of opposed cutting blades to detach and remove the flower from the flower stem.

48. The method of claim 47, wherein the rim further comprises a plurality of pairs of opposed cutting blades, wherein each of the plurality of pairs of opposed cutting blades has a different width or configuration, the method further comprising:
  selecting a pair of opposed cutting blades that is appropriately sized and configured to remove the flower.

* * * * *